US012707387B2

(12) United States Patent
Alpert et al.

(10) Patent No.: US 12,707,387 B2
(45) Date of Patent: Aug. 11, 2026

(54) RESUME AND SUSPEND PERIODIC SERVICE

(71) Applicant: TEXAS INSTRUMENTS INCORPORATED, Dallas, TX (US)

(72) Inventors: Yaron Alpert, Hod-Hasharon (IL); Yoav Ben-Yehezkel, Netanya (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 569 days.

(21) Appl. No.: 17/884,802

(22) Filed: Aug. 10, 2022

(65) Prior Publication Data

US 2023/0068824 A1 Mar. 2, 2023

Related U.S. Application Data

(60) Provisional application No. 63/237,649, filed on Aug. 27, 2021.

(51) Int. Cl.
*H04W 52/02* (2009.01)
*H04L 5/00* (2006.01)

(52) U.S. Cl.
CPC ....... *H04W 52/0216* (2013.01); *H04L 5/0053* (2013.01); *H04W 52/0274* (2013.01)

(58) Field of Classification Search
CPC .......... H04W 52/0216; H04W 52/0274; H04L 5/0053; Y02D 30/70
See application file for complete search history.

(56) References Cited

U.S. PATENT DOCUMENTS

| | | | | |
|---|---|---|---|---|
| 10,667,169 | B2 | 5/2020 | Wang et al. | |
| 10,834,670 | B2 | 11/2020 | Hou et al. | |
| 10,966,152 | B2 | 3/2021 | Wang et al. | |
| 2016/0219522 | A1* | 7/2016 | Asterjadhi | H04W 52/0235 |
| 2019/0053155 | A1* | 2/2019 | Kneckt | H04W 72/23 |
| 2019/0268846 | A1* | 8/2019 | Xiao | H04W 52/0229 |
| 2020/0374802 | A1* | 11/2020 | Chu | H04W 28/082 |

(Continued)

OTHER PUBLICATIONS

Nurchis et al., "Target Wake Time: Scheduled Access in IEEE 802.11ax WLANs," published on Arxiv 1084.07717, Apr. 20, 2018, 13 pages.

(Continued)

*Primary Examiner* — Yu-Wen Chang
(74) *Attorney, Agent, or Firm* — Michelle F. Murray; Frank D. Cimino

(57) ABSTRACT

A method is provided. In some examples, the method includes initiating, by a host application in a station, resumption of target wakeup time (TWT) service between the station and an access point. In addition, the method includes transmitting, by a communication interface in the station to the access point, a request to resume the TWT service. The method further includes generating, by the host application, data for transmission to the access point and transmitting, by the communication interface to the access point, the generated data. The method also includes receiving, by the station after transmitting the generated data, a response from the access point and initiating, by the host application, suspension of the TWT service. Moreover, the method includes transmitting, by the communication interface to the access point, a request to suspend the TWT service.

19 Claims, 28 Drawing Sheets

(56) References Cited

U.S. PATENT DOCUMENTS

| | | | | |
|---|---|---|---|---|
| 2021/0144637 | A1* | 5/2021 | Kwon | H04W 80/02 |
| 2022/0078706 | A1 | 3/2022 | Ghosh | |
| 2022/0080883 | A1 | 3/2022 | Monajemi et al. | |
| 2022/0110056 | A1 | 4/2022 | Ahn et al. | |
| 2022/0124746 | A1 | 4/2022 | Azizi et al. | |
| 2022/0141770 | A1* | 5/2022 | Ahn | H04W 52/0222 370/318 |
| 2023/0033678 | A1* | 2/2023 | Hu | H04W 52/0216 |
| 2023/0422234 | A1* | 12/2023 | Baek | H04W 52/0216 |
| 2024/0073950 | A1* | 2/2024 | Jang | H04W 52/0216 |

OTHER PUBLICATIONS

U.S. Appl. No. 17/726,355, filed Apr. 21, 2022.

* cited by examiner

RESUME AND SUSPEND PERIODIC SERVICE

This application claims the benefit of U.S. Provisional Patent Application No. 63/237,649, filed Aug. 27, 2021, the entire content being incorporated herein by reference.

BACKGROUND

Wireless Fidelity (Wi-Fi) is a wireless technology which uses radio waves to connect devices to various networks, including the Internet, and is generally based on the Institute of Electrical and Electronics Engineers (IEEE) 802.11 specification. This IEEE 802.11 specification provides a set of media access control (MAC, or Data Link) layer and physical (PHY) layer specifications for implementing wireless local area network (WLAN) communications. The PHY layer and MAC layer reside in the Open Systems Interconnection (OSI) stack or the OSI model, where layer-1 (L1) is known as the PHY layer and layer-2 (L2) is known as the MAC layer. Wi-Fi helps enable wireless devices to connect directly to one another, to local area networks, to wide area networks, or to the Internet generally. As such, Wi-Fi is helping fuel the expansion of the Internet of Things (IoT) by helping IoT devices to wirelessly communicate with other devices.

The IoT refers to a system of networked computing devices which can exchange data with other networked computing devices. These computing devices can include traditional computing devices such as desktop computers, laptops, notebooks, tablets, and smartphones, as well as other devices, such as sensors, smoke detectors, electronic locks, electronic meters, smart home devices, embedded systems, etc. In many cases, these computing devices are battery powered and techniques to help optimize power consumption may be desired.

SUMMARY

In some examples, a method includes initiating, by a host application in a station, resumption of target wakeup time (TWT) service between the station and an access point. In addition, the method includes transmitting, by a communication interface in the station to the access point, a request to resume the TWT service. The method further includes generating, by the host application, data for transmission to the access point and transmitting, by the communication interface to the access point, the generated data. The method also includes receiving, by the station after transmitting the generated data, a response from the access point and initiating, by the host application, suspension of the TWT service. Moreover, the method includes transmitting, by the communication interface to the access point, a request to suspend the TWT service.

In further examples, a device includes transceiver circuitry and processing circuitry configured to initiate resumption of target wakeup time (TWT) service with an access point. The processing circuitry is also configured to cause the transceiver circuitry to transmit, to the access point, a request to resume TWT service. The processing circuitry is further configured to generate data for transmission to the access point and cause the transceiver circuitry to transmit the generated data to the access point. In addition, the processing circuitry is configured to receive, after transmitting the generated data, a response from the access point and initiate suspension of the TWT service. Moreover, the processing circuitry is configured to cause the transceiver circuitry to transmit, to the access point, a request to suspend the TWT service.

In yet further examples, a non-transitory computer-readable medium having executable instructions stored thereon, configured to be executable by processing circuitry for causing the processing circuitry to initiate resumption of target wakeup time (TWT) service with an access point. The instructions are further configured to cause the processing circuitry to cause transceiver circuitry to transmit, to the access point, a request to resume the TWT service. In addition, instructions are further configured to cause the processing circuitry to generate data for transmission to the access point and to cause the transceiver circuitry to transmit the generated data to the access point. The instructions are also configured to cause the processing circuitry to receive, after transmitting the generated data, a response from the access point and to initiate suspension of the TWT service. Moreover, the instructions are configured to cause the processing circuitry to cause the transceiver circuitry to transmit, to the access point, a request to suspend the TWT service.

BRIEF DESCRIPTION OF THE DRAWINGS

Features of the present invention may be understood from the following detailed description and the accompanying drawings. In that regard.

DETAILED DESCRIPTION

Figure 1:
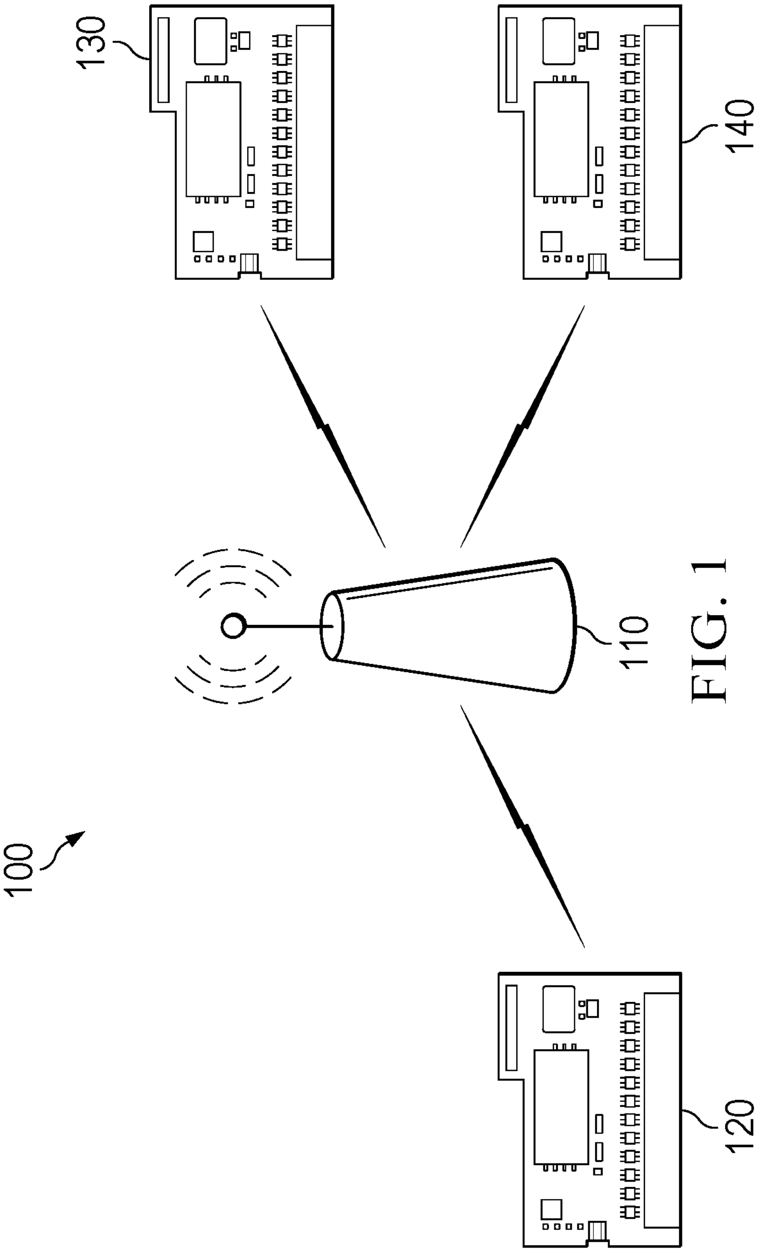
FIG. 1 is a conceptual block diagram of a system including an access point and three stations according to some aspects of the present disclosure.

Specific examples are described below in detail with reference to the accompanying figures. A network may include an access point in communication with one or more stations. The stations may be remote from the access point and configured to perform some function, such as transmitting sensor data back to the access point. For example, a first station may be coupled to a camera and configured to send images captured by the camera to the access point. A second station in the network may be coupled to a temperature sensor and configured to send temperature data to the access point.

In the example of Internet of Things (IoT) stations, the communication between each station and the access point may be sparse and/or bursty. A station may operate in a low-power state for a long period of time before activating to perform a function and then returning to the low-power state. For example, the station may wake from the low-power state, resume communication with the access point, transmit data, and suspend communication with the access point. To conserve energy, the resumption and suspension of communication between the station and the access point should be optimized.

According to the specification for Institute of Electrical and Electronics Engineers (IEEE) 802.11ax amendment, which is also known as Wi-Fi 6 or IEEE802.11 be amendment, which is also known as Wi-Fi 7, an access point can arrange its communications with each station by establishing service periods (i.e. target wakeup time (TWT) service), where each station is assigned to a respective service period pattern. The station can join a TWT service by one of the following: (1) a station can request and negotiate, with the access point, a specific, pre-defined service period pattern using service period patterns negotiation flow through beacon and other management frames. Once the station and access point have agreed upon TWT Service Period (TWT SP) negotiation of terms, and for as long as the TWT session is resumed, the access point can serve the station in its designated TWT service period. Such negotiation consists of several packet exchanges between the access point and the station, and this negotiation can take a substantial amount of time. This negotiated service is referred to as individual TWT or unicast TWT. (2) The access point can transmit a beacon to the stations, where the beacon packet includes information on the upcoming round of service periods, such as the start time and duration of each service period. This type of service is referred to as broadcast TWT). These approaches can together be referred as a target wakeup time (TWT) based system.

In accordance with the techniques of this disclosure, after the TWT service has been established and then suspended, a station may be configured to transmit a request to resume TWT service to the access point. In addition, the station can transmit data to the access point before or during the first service period after the station transmits the request to resume. After receiving a response to the transmitted data from the access point, the station can transmit a request to suspend TWT service to the access point. The station can request resumption and suspension of TWT service through short and simple signaling to the access point (e.g., a single management packet or on through a WLAN header field) without having to renegotiate the terms of that service.

The techniques of this disclosure may accomplish the necessary communication at a lower power consumption for the station, as compared to other approaches. Efficient power usage may be especially important for low-power IoT devices. A station may be able to communicate more efficiently with an access point by using the operation flows described herein because of the timing of the transmissions before, during, and after the service period. Moreover, the techniques described herein allow for IoT devices to introduce their traffic into heavily utilized and congested wireless environments, which is a goal of Wi-Fi 6, 7, and 8. Of course, these advantages are merely examples, and no advantage is required for any particular embodiment.

Examples of communication between an access point and a station are described with reference to the figures below. In that regard, FIG. 1 is a conceptual block diagram of a system 100 including an access point 110 and three stations 120, 130, and 140 according to some aspects of the present disclosure. In the example shown in FIG. 1, access point 110 is wirelessly communicatively coupled to stations 120, 130, and 140. Additional example details of communication between an access point and a station can be found in commonly assigned U.S. patent application Ser. No. 17/726,355, entitled "Power Aware Event Scheduling," filed on Apr. 21, 2022, which is incorporated by reference in its entirety.

Although this disclosure describes system 100 in the context of Wi-Fi communication, specifically Wi-Fi 6 and other Wi-Fi versions (for example, Wi-Fi 7), other the techniques of this disclosure may be implemented for other types of communication, such as Bluetooth (e.g., Bluetooth Low Energy®), Zigbee, ethernet, other versions of Wi-Fi, and/or any other communication protocol. FIG. 1 depicts system 100 as a wireless system, but the techniques of this disclosure can also be implemented in systems using wired communication or a combination of wireless and wired communication.

FIG. 1 also depicts each of stations 120, 130, and 140 as electronic devices including components mounted on a circuit board. In some examples, one or more of stations 120, 130, and 140 may include or be coupled to an IoT device such as a camera, temperature sensor, humidity sensor, motion sensor, occupancy sensor, radar sensor, smoke detector, electronic lock, electronic meter, smart home device, or embedded system. Station 120, 130, and/or 140 may be configured to process and transmit data obtained by a sensor to access point 110.

Station 120, for example, may transmit a transmission control protocol (TCP) packet to access point 110. The TCP packet includes data that is bound for a remote computing device coupled to access point 110 via the internet. After receiving the TCP packet, access point 110 forwards the data to the remote computing device (i.e., the final destination) and waits to receive feedback from the remote computing device. When access point 110 receives the feedback from the remote computing device, access point 110 will forward this feedback to station 120 in the form of a TCP acknowledgment. Thus, the round-trip time from station 120 to the final destination and back to station 120 may be much longer than the round-trip time between access point 110 and station 120.

Figure 2:
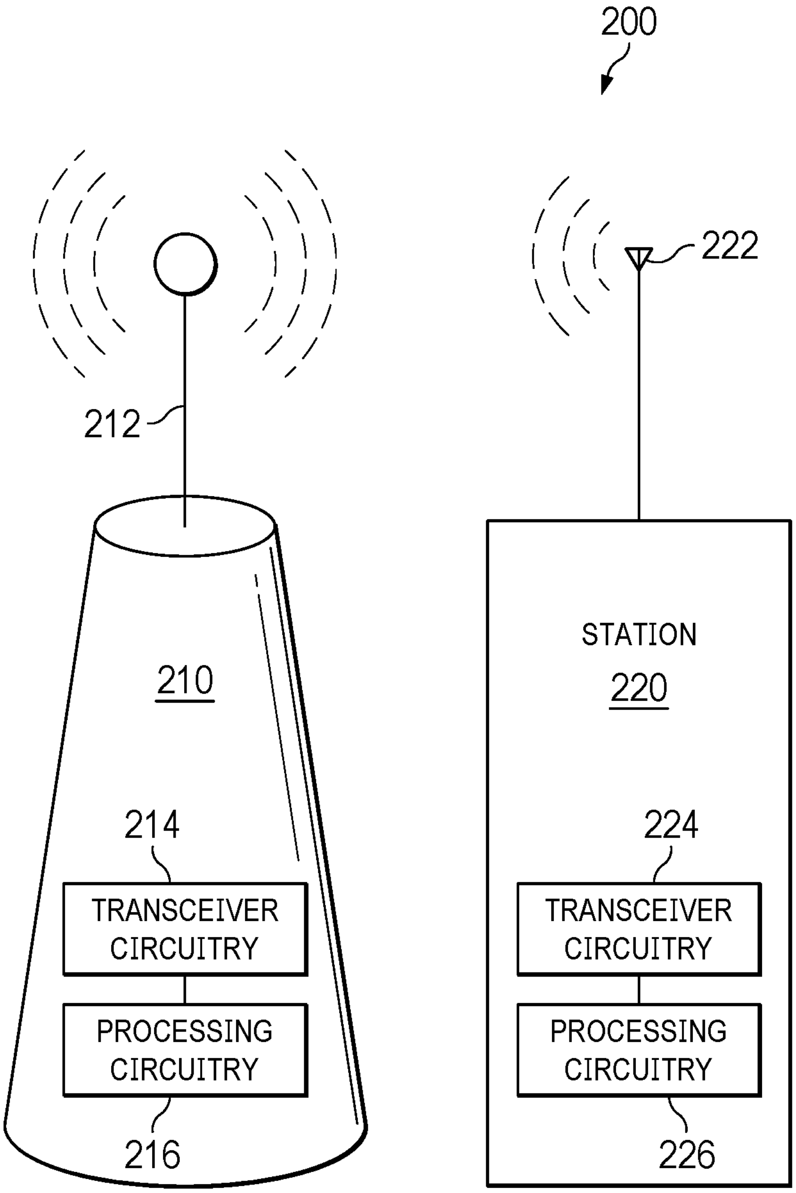
FIG. 2 is a conceptual block diagram of a system including an access point and a station according to some aspects of the present disclosure.

FIG. 2 is a conceptual block diagram of a system 200 including an access point 210 and a station 220 according to some aspects of the present disclosure. Access point 210 includes antenna 212, transceiver 214, and processing circuitry 216. Station 220 includes antenna 222, transceiver 224, and processing circuitry 226. Processing circuitry 226 may be configured to implement a host application by executing instructions stored to memory. Processing circuitry 226 may generally correspond to host 530 of station 500 shown in FIG. 5, and transceiver circuitry 224 may generally correspond to communication interface 502 of station 500 shown in FIG. 5.

In at least some examples, processing circuitry 226 in station 220 constructs a data packet for transmission to access point 210. The packet may include data obtained by a sensor coupled to station 220. Processing circuitry 226 may be configured to construct the packet to include a header, a payload, and an error correction code. Processing circuitry 226 then causes transceiver circuitry 224 to transmit the packet via antenna 222 to station 220. Access point 210 listens in order to receive the packet at antenna 212, and transceiver circuitry 214 filters and/or amplifies the signal encoding the packet. Transceiver circuitry 214 and/or processing circuitry 216 may be configured to decode the packet signal and store the packet data to memory (not shown in FIG. 2).

Transceiver circuitry 214 and processing circuitry 216 may be configured to perform the same steps as transceiver circuitry 224 and processing circuitry 226 in generating and transmitting packets. The same general steps may be undertaken by processing circuitry 216 and 226 and transceiver circuitry 214 and 224 to generate and transmit the requests, packets, trigger frames, acknowledgments, and beacons described herein.

Figure 3:
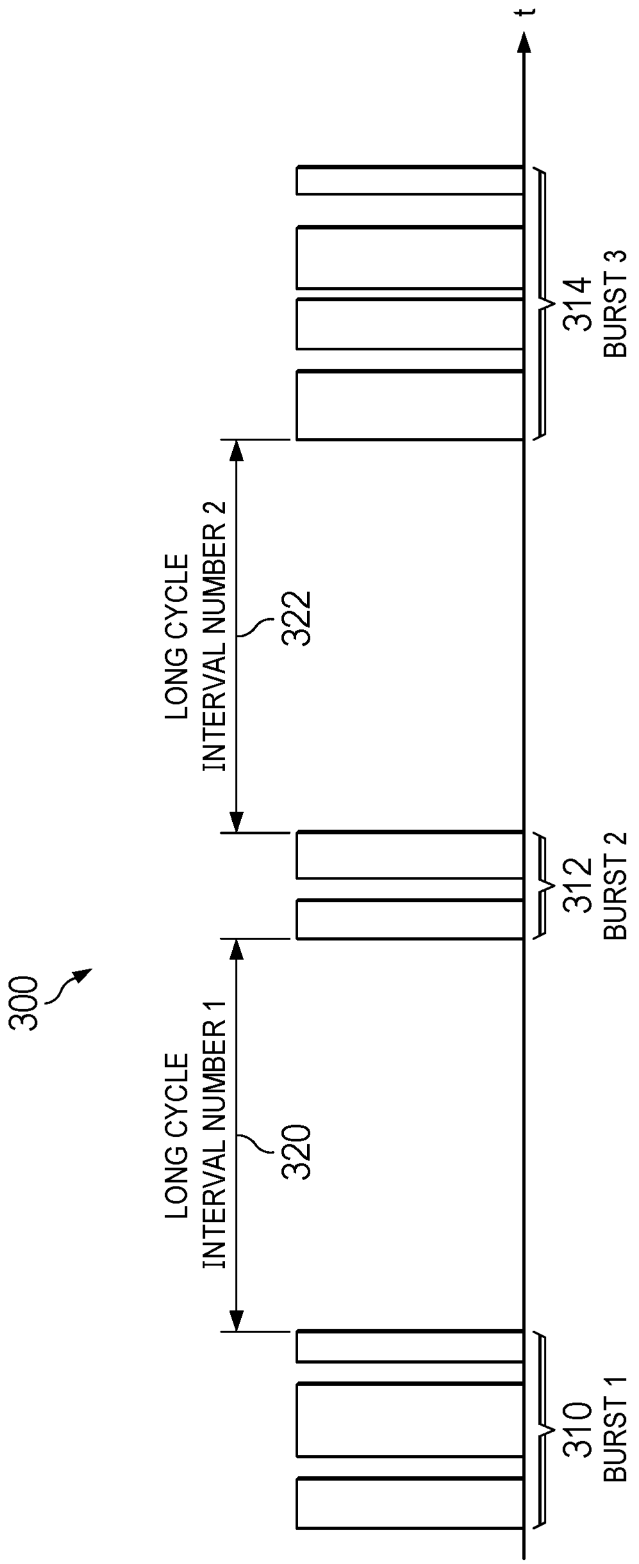
FIG. 3 is a timing diagram showing sparse, bursty traffic according to some aspects of the present disclosure.

FIG. 3 is a timing diagram 300 showing sparse, bursty traffic according to some aspects of the present disclosure. Timing diagram 300 shows an example of on-demand operation mode for a station, where the station communicates with the access point during bursts 310, 312, and 314 and then transitions to intervals 320 and 322 without communication. Timing diagram 300 shows the packets transmitted by a station to an access point in three bursts 310, 312, and 314. Each of bursts 310, 312, and 314 may be even shorter than the duration of a normal TWT service period, and each of intervals 320 and 322 may be much longer than a beacon interval. During each of bursts 310, 312, and 314, the station transmits one or more densely distributed uplink packets in a short time period, separated by long intervals of no communication between bursts 310, 312, and 314. The sparse traffic shown in FIG. 3 is a common IoT application use case, where each of bursts 310, 312, and 314 is triggered by quasi-periodic events.

For example, the station transmits three packets in burst 310 before entering a low-power state during long cycle interval 320. To initiate long cycle interval 320, the station may be configured to transmit a request to suspend to the access point. At the end of long cycle interval 320, the station transmits two packets in burst 312 before entering another low-power state during long cycle interval 322. To initiate on-demand service during burst 312, the station can transmit a request to resume TWT service. At the end of long cycle interval 322, the station transmits four packets in burst 314 before entering a third low-power state (not labeled in FIG. 3). Long cycle intervals 320 and 322 may be longer than a typical delivery traffic indication map (DTIM) period between bursts 310, 312, and 314.

Figure 28:
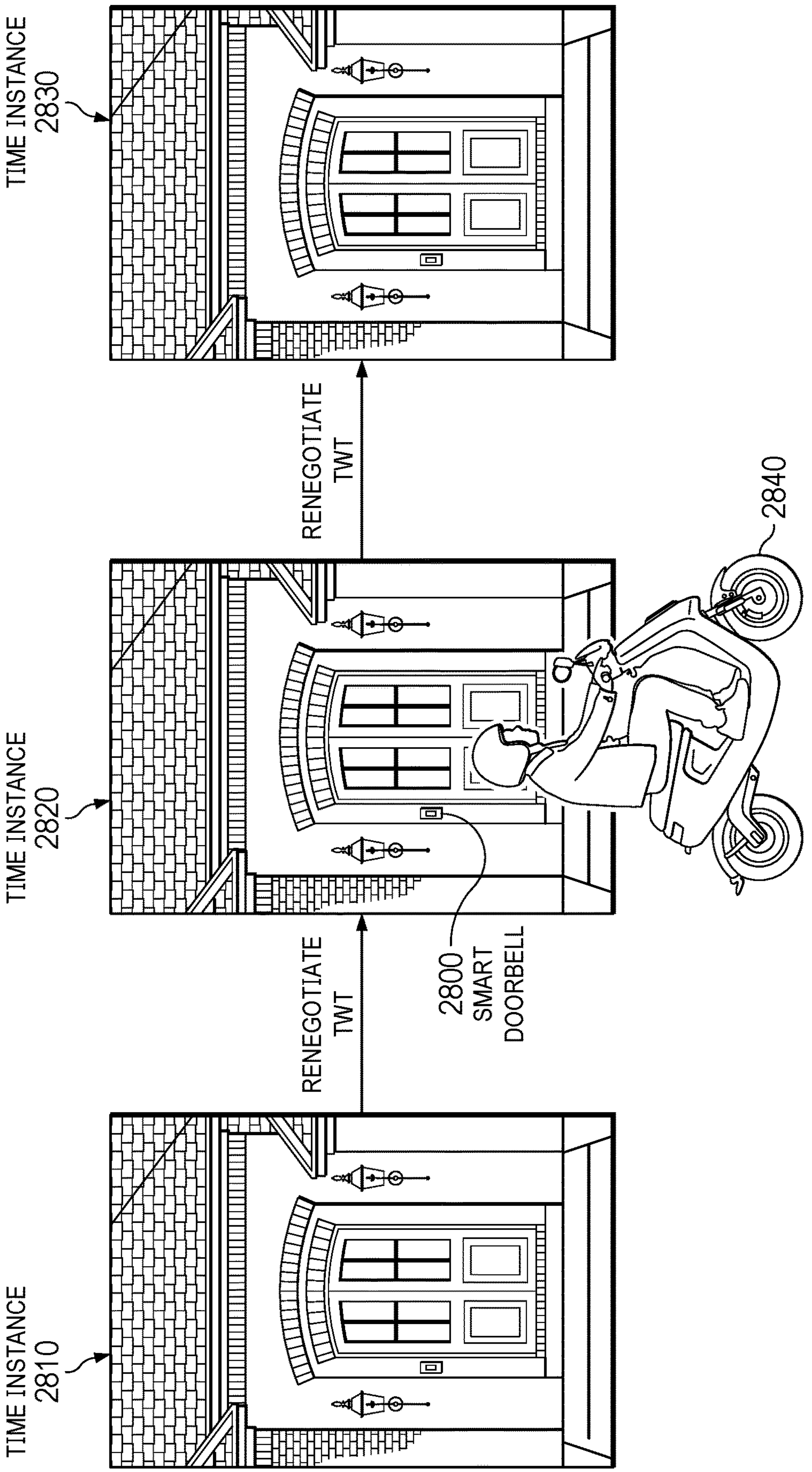
FIG. 28 is a diagram of a smart doorbell that renegotiates for different rates of traffic according to some aspects of the present disclosure.

The on-demand communication shown in timing diagram 300 may be referred to as "sparse traffic," where each burst 310, 312, or 314 includes one or more packets that may not take up an entire TWT service period. Bursts 310, 312, and 314 in sparse traffic may occur at sporadic intervals, where each interval is longer than the access point's beacon interval. The access point would otherwise deny TWT servicing to the station, if not for the requests to resume and suspend issued by the station. In contrast, under continuous operation mode, the station can participate in every TWT service period without any having to issue any requests to suspend or resume. FIG. 28 shows an example of a station toggling from sparse traffic to continuous mode and then back to sparse traffic.

In the example of TCP, there is a period of time after a station sends TCP data, during which the station waits for the TCP acknowledgment (TCP ACK). While waiting for TCP ACK, the station consumes power to retain the TCP packet in the networking stack for possible retransmission. Retention of the TCP packet in the networking stack requires standby current until the TCP packet is released upon processing the TCP ACK. The station remains in standby mode until receiving the TCP ACK. In addition, the TCP ACK may arrive so late that the station "times out" (e.g., a TCP acknowledgment time out timer expires) and retransmits the TCP packet by default. For example, the TCP retransmission timeout is two hundred milliseconds for the Windows 7 Operating System produced by Microsoft of Redmond, Washington.

Traditional uplink traffic over Wi-Fi in low power modes include delivery broadcast and download unicast traffic indication map (TIM)/beacon or the optimization of TWT level power/operation. Host upper layers (i.e., open systems intercommunication (OSI) layers three and higher) are unaware of the sleep/wakeup state timing of the lower layer communication interface. The host upper layers can schedule transmissions to the communication interface as soon as the host finishes generating a packet. The communication interface queues the incoming packet until the interface can transmit the packet over the air according to media access control (MAC) protocol. The communication interface later receives feedback from the access point as part of the MAC protocol rules. Until Wi-Fi 6/7, packets were polled from the access point after the access point indicates traffic to a specific station on beacons. With Wi-Fi 6/7, this operation is adapted to TWT service periods where the wakeup period for reception spans during the TWT service period to replace the beacon indication at every TIM beacon interval. After receiving the feedback, the communication interface sends the feedback to the host for further processing.

Figure 4:
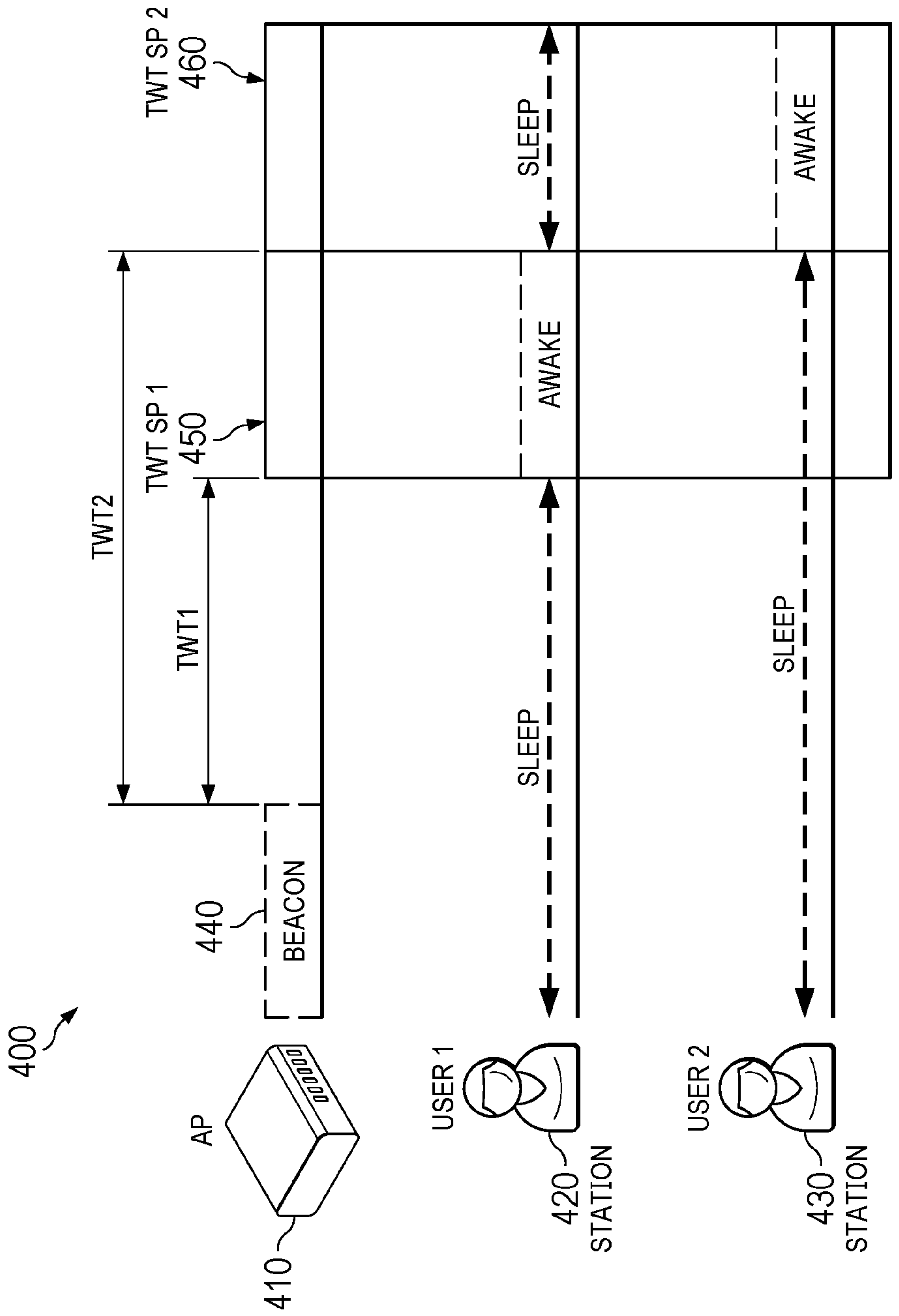
FIG. 4 is a timing diagram for individual service periods involving an access point and two stations according to some aspects of the present disclosure.

FIG. 4 is a timing diagram 400 for individual service periods 450 and 460 involving an access point 410 and two stations 420 and 430 according to some aspects of the present disclosure. Timing diagram 400 represents a schedule for stations 420 and 430 to communicate with access point 410 in a power-efficient manner. The schedule shown in timing diagram 400 may be based on agreements negotiated between access point 410 and stations 420 and 430 for individual service periods 450 and 460.

Each of stations 420 and 430 have an active TWT service agreement with access point 410 and can remain in a low-power sleep mode except for their respective awake periods (i.e. TWT service periods 450 and 460). During their awake periods, each station can send data to access point 410 before returning to the sleep mode. In examples in which station 420 has no data to transmit to access point 410, station 420 can preemptively send a request to suspend its agreement with access point 410 for TWT service. In response to the request to suspend, access point 410 may be configured to not schedule station 420 for a TWT service period until access point 410 receives a request to resume from station 420, or until station 420 negotiates a new agreement with access point 410. This framework may be especially useful for low-power IoT sensors with sparse data communication and for IoT sensors that toggle between sparse and dense communication.

At the beginning of timing diagram 400, access point 410 sends beacon 440 to stations 420 and 430. Beacon 440 is an optional communication from access point 410 that may include information such as the scheduled starting time for a broadcast service period, which is not shown in FIG. 4. For example, beacon 440 may include a TWT (e.g., start time) for the broadcast service period, where the TWT is the length of time from beacon 440 to the scheduled starting time of the service period. Station 420 and/or 430 can participate in the broadcast service period or ignore beacon 440. For example, station 420 can participate in service period 450 and/or the broadcast service period to send and receive data with access point 410.

The implementation of TWT can reduce the power consumption of devices 410, 420, and 430 and can improve the spectral efficiency by enabling these devices to determine how often to wake in order to send and/or receive data. This technology enables IEEE 802.11 ax/be deployments to consistently deliver higher quality of service for multi-device system with minimal contention or overlap. As implemented in Wi-Fi 6/7, TWT replaces the power-save methodology of versions 3, 4, and 5 of Wi-Fi.

Up to IEEE 802.11 ac (baseline for Wi-Fi 5), random and distributed air access method was used, for example, Enhanced Distributed Channel Access (EDCA). In IEEE 802.11ax/be (baseline for Wi-Fi 6 and Wi-Fi 7, respectively), an access-point-centric approach is taken to control air-access of highly dense congested networks to utilize the air budget properly. For that approach, 802.11ax/be introduces a Trigger-Based operation methodology for TWT mechanism (TB-TWT). TB-TWT enables the access point to schedule air access and reduce the overhead and inefficiency of the EDCA method for obtaining transmission opportunities (TXOPs). TB-TWT also allows for power saving stations to reduce power consumption because the access point, through beacons and through prior agreed upon negotiation with each station individually, explicitly identifies the TWT service period time in which each station should be awake. In addition, the TWT servicing operation methodology is divided into announced and unannounced variants. The announced TWT operation requires access point 410 to probe whether the station is actually present in the TWT service period by sending out a Trigger frame before sending out actual data to the station. In the unannounced case, access point 410 assumes that the station must be present in all the TWT service period and can send out its downlink data to the station, even without probing for the presence of the station. Access point 410 can assume that the station should have significant traffic (either incoming or outgoing) in most TWT service periods, which occupies the computation and memory bandwidth of access point 410, which do not serve other station(s) in the network. If station 420 is not present in most active/resumed TWT service periods, access point 410 may impose sanctions on station 420 in terms of current and future TWT agreements (e.g., denial or reduced TWT services to the STA, etc.).

TWT can be tuned to continuous services, referred to as Wi-Fi Alliance Wi-Fi 6 TWT certification profile R1, and to non-continuous transient services, referred to as Wi-Fi Alliance Wi-Fi 6 TWT certification profile R2. The Wi-Fi Alliance in Wi-Fi 6 certification programs has issued two separate releases, namely R1 and R2, where advanced TWT capabilities from 802.11ax are certifiable in R2 to extend basic TWT capabilities certifiable by R1. For R1, access point 410 will schedule a broadcast service period every beacon interval for each station, and the stations cannot be serviced outside of their individual service period or the broadcast service period. For R1, the station must be present during the service period (for unannounced TWT), or access point 410 will first verify that the station is present during the individual service period (for announced TWT). For R2, devices in the network can temporarily suspend and temporarily resume the individual TWT service periods.

In the example shown in FIG. 4, station 420 operates in sleep mode except for service period 450 and any other service periods (e.g., unicast and/or broadcast) scheduled in beacon 440, when station 420 wakes to communicate with access point 410. Similarly, station 430 operates in sleep mode except for service period 460 and any other service period s (e.g., unicast and/or broadcast), when station 430 wakes to communicate with access point 410. The wake periods shown in FIG. 4 may be very short (e.g., milliseconds) relative to the sleep periods (e.g., seconds, minutes, hours, or days), depending on the agreements negotiated between entities 410, 420, and 430. In some examples, access point 410 may be capable of communicating with multiple stations during a single service period using frequency-division multiplexing.

Figure 5:
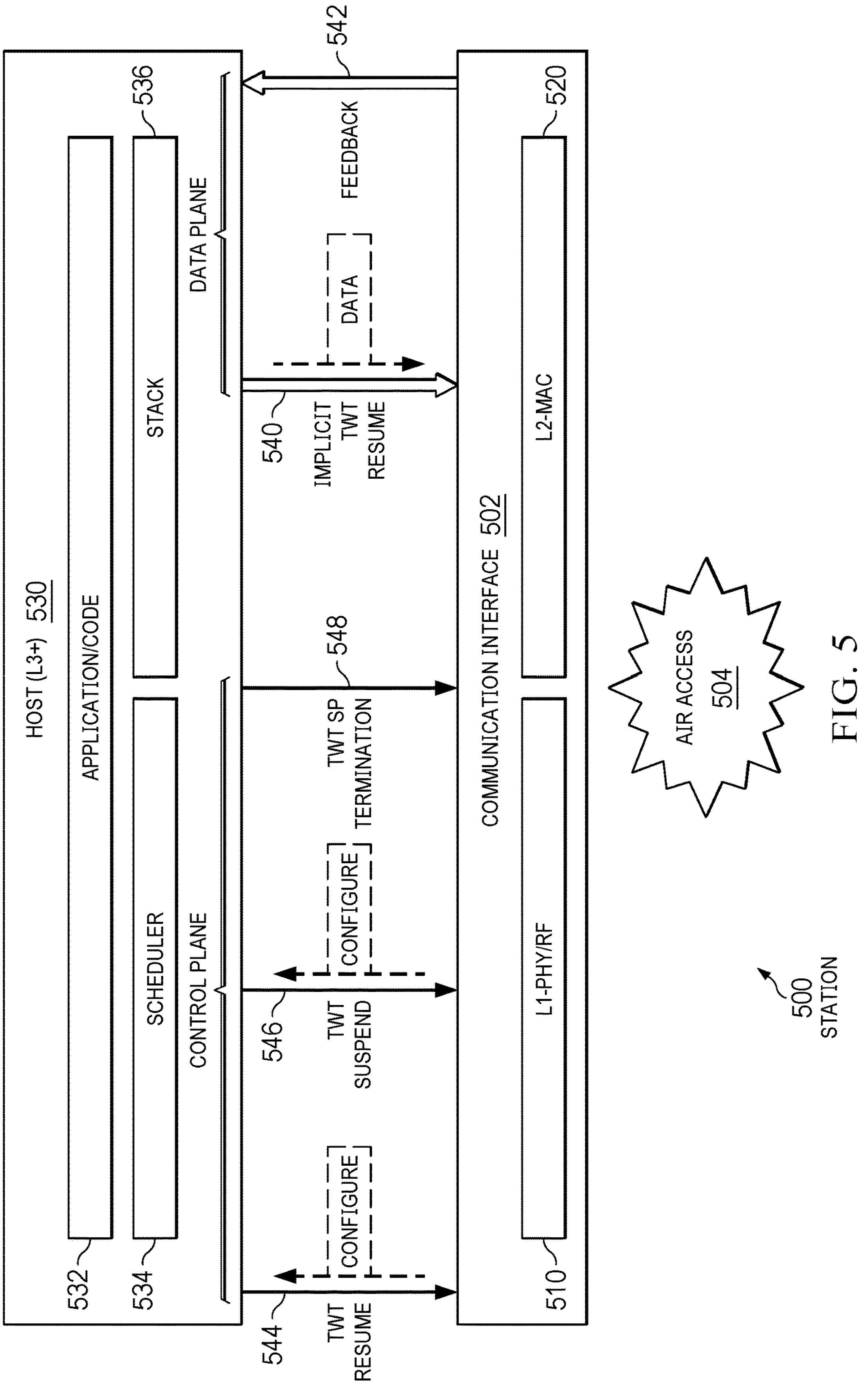
FIG. 5 is a conceptual block diagram of open systems intercommunication layers in a station.

FIG. 5 is a conceptual block diagram of OSI layers 510, 520, and 530 in a station 500. Station 500 includes communication interface 502 includes L2/MAC layer functionality 520 (OSI layer 2) and PHY layer 510 (OSI layer 1). Communication interface 502 may correspond to transceiver circuitry 224 shown in FIG. 2, although processing circuitry 226 may also perform some of the functionality attributed to communication interface 502. Communication interface 502 is configured to transmit and receive signals with another device, such as an access point, across air access 504.

Host 530 (OSI layer 3 and up to OSI layer 7) includes application 532, scheduler 534, and stack 536. Host 530 may correspond to an application running on processing circuitry 226 shown in FIG. 2. Station 500 can implement host 530 by executing the code in application 532. Host 530, for example, may be an operating system configured to host other applications. Host 530 executes from a memory (not shown) that is coupled to processing circuitry (not shown). Host 530 may include scheduler 534, which coordinates operations performed by host 530 and station 500. For example, scheduler 534 may help coordinate when one or more portions of the wireless device may exit a low-power state, or when certain application 532 may be executed.

Host 530 hosts one or more applications 532, which are executable programs (e.g., machine code instructions) to perform various operations. For example, application 532 may obtain data from a sensor and interpret the data. As a more specific example, application 532 may configure scheduler 534 to periodically trigger an application event which indicates to application 532 to perform a function to generate data for transmission, such as by capturing an image from a camera sensor.

Application 532 may generate data for transmission to an access point based on sensed data, such as the captured image, or, in some cases, application 532 may process the data such as by running one or more image processing algorithms on the image to detect certain objects in the image. Application 532 may then generate data based on the processing, such as an indication whether an object is present, to send to another networked device. Application 532 may then send the generated data to network stack 536, for example, using an application layer protocol such as Hypertext Transfer Protocol (HTTP). Network stack 536 may then packetize and encapsulate the HTTP data using a transport layer protocol such as TCP/Internet Protocol (IP) and data 540 is passed to communications interface 502 for transmission to the networked device.

Communication interface 502 can communicate with host 530 via signals 540, 542, 544, 546, and 548. For example, host 530 can send data 540 to communication interface 502, and data 540 may include an implicit TWT resume trigger when TWT service has been suspended. The implicit trigger causes communication interface 502 to request resumption of TWT service before or concurrent with transmitting data 540 when communication interface 502 determines that the opportunity arises (e.g., no more traffic queued or the reception of a given number of packets). After transmitting data 540 across air access 504, communication interface 502 receives feedback from the access point and sends feedback 542 to host 530.

To facilitate communication with the access point while promoting energy efficiency, host 530 can send trigger signals 544, 546, and/or 548 to communication interface 502. To resume TWT service after a suspended state, host 530 may be configured to send trigger signal 544 to communication interface 502 to cause communication interface 502 to transmit a request to resume TWT service to the access point. To suspend TWT service, host 530 may be configured to send trigger signal 546 to communication interface 502 to cause communication interface 502 to transmit a request to suspend TWT service to the access point. Responsive to receiving trigger signal 544 or 546, communication interface 502 can send a confirmation signal back to host 530.

In some examples, host 530 may be configured to determine a timing for resumption of TWT service, for example, as part of initiating suspension of TWT service. Host 530 can send an indication of the timing to communication interface 502 as part of, or along with, trigger signal 546. As the timing for resumption approaches, host 530 may be configured to cause station 500 to wake from a low-power state so that station 500 can resume TWT service at the previously determined timing.

The trigger signals generated by host 530 may be implicit or explicit, where "explicit" means that host 530 commands communication interface 502 to immediately send the corresponding request. "Implicit" means that host 530 commands communication interface 502 to send the corresponding request upon the occurrence of some L2 events (e.g., when no more traffic is queued, or after the reception of a given number of expected packets).

Communication interface 502 in this example includes a controller which provides L2/MAC layer functionality 520. Communication interface 502 may be, for example, a Wi-Fi module or integrated circuit. MAC layer 520 helps control PHY layer 510 hardware that provides the interface with the wireless medium (e.g., radio frequency spectrum). PHY layer 510 may include an RF front end (not shown for clarity) that processes an RF signal for PHY layer 510. MAC layer 520 may also coordinate the operations of PHY layer 510 and RF front end, for example, by directing when PHY layer 510 should access the wireless medium through the RF front end to transmit or receive wireless transmissions to and from an access point via the wireless medium. As an example, MAC layer 520 may schedule PHY layer 510 operations based on scheduled reference events such as beacon signals and/or TWT control signals received from the access point. MAC layer 520 may direct the PHY layer 510 to access the wireless medium to receive the beacon signals to determine future transmit/receive opportunities and/or direct PHY layer 510 to transmit data in accordance with TWT opportunities.

MAC layer 520 also coordinates data transmissions received from higher levels. For example, MAC layer 520 may split IP based packets such as TCP received from network stack 536 into one or more data frames for transmission by PHY layer 510. After the data frames of one or more TCP packets are transmitted, communications interface 502 may access the wireless medium to listen for feedback such as TCP based feedback transmitted to the wireless device. MAC layer 520 may reassemble received data frames containing, for example, TCP feedback 542 and pass TCP feedback 542 to network stack 536 for processing.

To help reduce power usage of communications interface 502, communications interface 502 may pass a sync message (not illustrated in FIG. 5) to host 530. The sync message may be directed, for example, to scheduler 534 or other application 532 executing on host 530 and capable of modifying scheduler 534. The sync message may include timing information related to one or more scheduled reference events and/or other operations related to the communications layer and communications interface 502. These scheduled reference events may include upcoming beacon reception times, TWT window for transmitting, etc.

Existing signaling between host 530 and communication interface 502 allows for setting and/or modifying TWT service operation parameters based on expected traffic from host 530. Host 530 can use this existing signaling for renegotiating or terminating a service period agreement. For example, host 530 may be configured to generate signal 548 to cause communication interface 502 to negotiate or terminate a service period agreement. Host 530 may be configured to generate signal 548 in response to determining that the level of traffic between station 500 and the access point should change. For example, a remote camera and/or microphone (e.g., a smart doorbell, an intercom device, a security camera, or the like) may switch from sparse traffic to dense traffic in response to user input, detecting motion, or some other event. Host 530 may be configured to generate signal 548 to cause a switch back to sparse traffic in response to a timer expiring, not detecting motion, or some event.

Host 530 can manage TWT service operation using closed-loop power-save signaling. Host 530 can dynamically resume TWT service based on incoming L3+ traffic and events. For example, host 530 can cause communication interface 502 to transmit a request to resume a TWT servicing to an access point in response to determining that data will be ready for transmission soon. Host 530 may be configured to cause communication interface 502 to transmit a request to resume TWT servicing after causing a sensor to collect data. In addition, host 530 can also dynamically suspend (e.g., temporarily terminate) TWT service based on incoming L3+ traffic and events.

Figure 6:
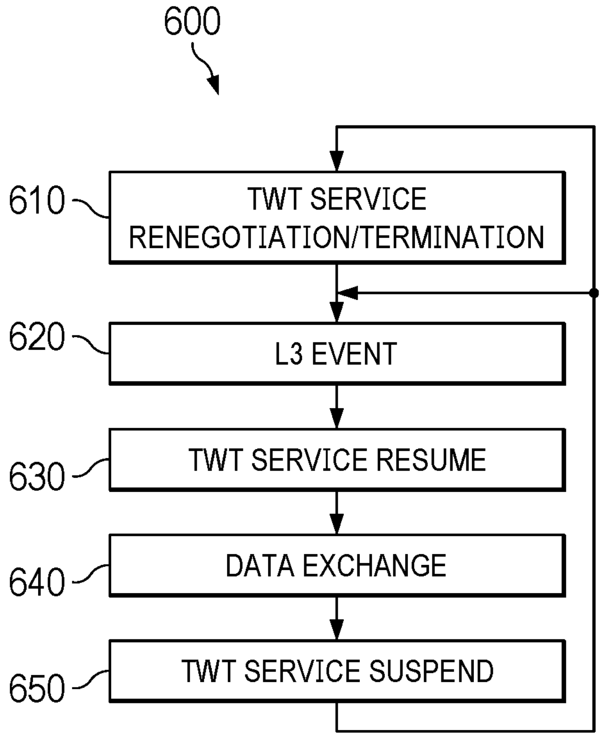
FIG. 6 is a flow diagram of the resumption and suspension of target wakeup time (TWT) service.
Figure 7:
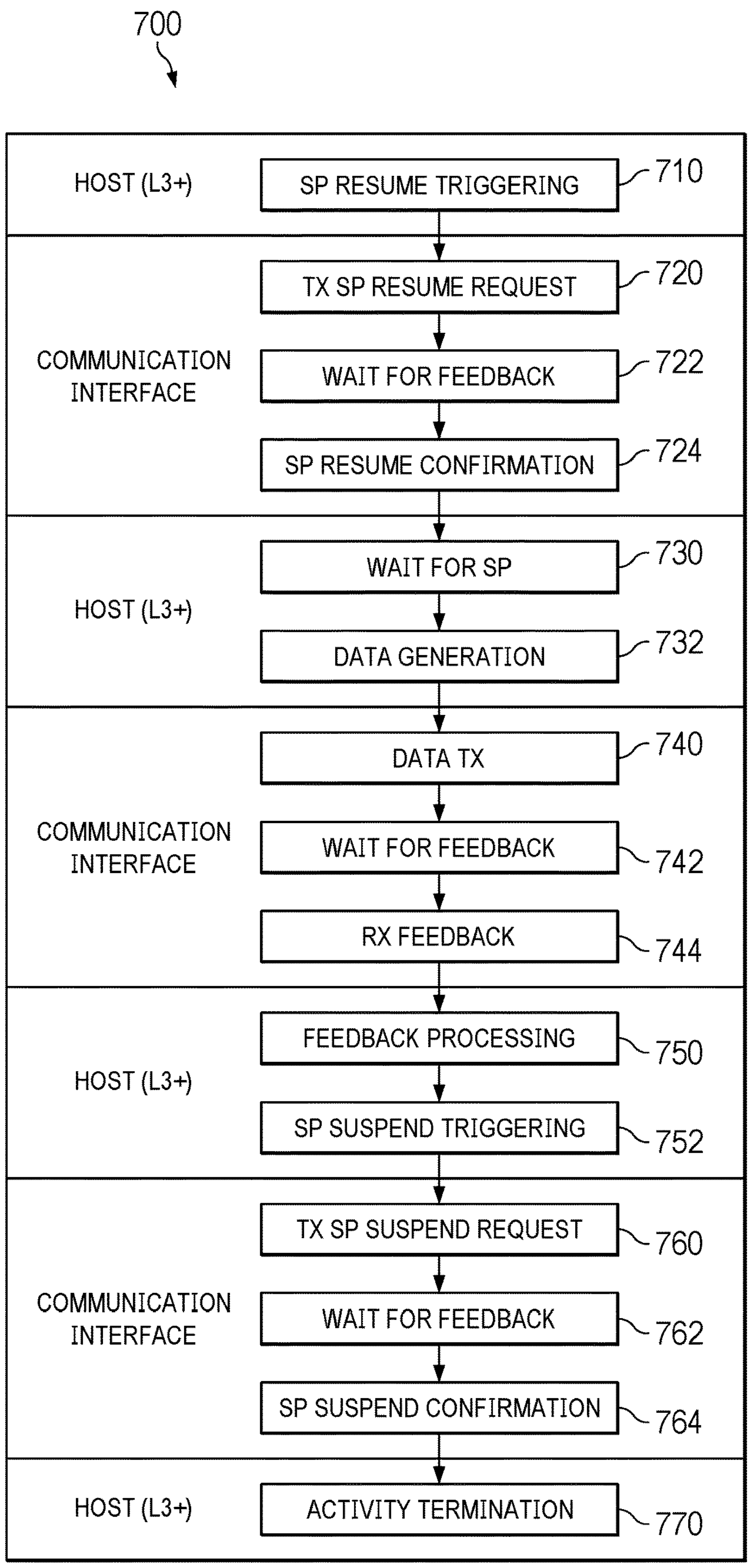
FIGS. 7-11 are flow diagrams of methods for resuming and suspending a TWT service period according to some aspects of the present disclosure.

FIG. 6 is a flow diagram of the resumption and suspension of TWT service. Referring to block 610, a station renegotiates and/or terminates a TWT service agreement. In the absence of any need to communicate with the access point, the station can terminate a TWT service agreement or negotiate/renegotiate a TWT service agreement so that the service periods occurs less or more often (i.e., sparser or denser traffic). Referring to block 620, the station initiates an L3 event, such as application code that, when executed, causes a sensor to gather data for transmission. Referring to block 630, the station causes the access point to resume TWT service, by sending a request to resume to the access point. The station may be configured to cause the access point to resume TWT service according to a previously negotiated agreement before the data is ready for transmission. In other words, the station may be configured to, in parallel, generate data for transmission and request resumption of a TWT service agreement.

Referring to block 640, the station sends data to the access point. Referring to block 650, the station causes the access point to suspend the TWT service agreement, either by sending a request to suspend to the access point or by setting a bit in a packet for transmission to the access point or by sending a special management suspend TWT packet. The station can request suspension of the TWT service agreement after the station has sent all of its data to the access point either explicitly upon end of traffic feedback from L2 or implicitly. The station can implicitly request suspension by commanding L2 to perform suspension upon some condition in parallel to sending the feedback to the application (e.g., upon reception of TCP ACK by L2, pass the TCP ACK for processing by L3 in parallel to suspending the TWT by indicating bit on the packet). After suspension, the station can wait for the next L3 event, renegotiate the TWT service agreement, and/or fully terminate the existing TWT service agreement.

FIGS. 7-11 are flow diagrams of methods for resuming and suspending a TWT service period according to some aspects of the present disclosure. Some processes of the methods 700, 800, 900, 1000, and 1100 may be performed in orders other than described, and many processes may be performed concurrently in parallel. Furthermore, processes of the methods 700, 800, 900, 1000, and 1100 may be omitted or substituted in some examples of the present disclosure. The methods 700, 800, 900, 1000, and 1100 is described with reference to station 500 shown in FIG. 5, although other components such as stations 120, 130, 140, 220, 420, and 430 shown in FIGS. 1, 2, and 4 may exemplify similar techniques. Station 500 may be configured to perform methods 700, 800, 900, 1000, and 1100 shown in FIGS. 7-11, or any combination thereof.

Referring to block 710, host 530 triggers resumption of the service period. Host 530 may be configured to trigger this resumption in response to executing the code in application 532. For example, the code in application 532 may cause a sensor to gather data and concurrently (or nearly concurrently) cause scheduler 534 to send trigger signal 544 to communication interface 502. Scheduler 534 may be configured to send trigger signal 544 a sufficient time before the beginning of the service period to allow for the access point to send confirmation that TWT service will resume and for host 530 to generate data 540 for transmission.

As an alternative to explicit triggering, station 500 can indicate implicitly that the TWT service agreement should be resumed by setting respective fields on a suspend TWT management frame. This is useful, if station 500 can expect when the next transmission event is to occur (for example, a periodic keep alive transmission every second). Station 500 can transmit a single management packet to both indicate a suspension of the TWT agreement (e.g. after the receipt of a TCP ACK) and time the resumption to align with timed TWT SP one second after the next expected keep alive packet is to be sent. Such a timing for trigger signal 544 will allow station 500 sufficient time to generate data 540 before the beginning of the next service period.

Referring to block 720, communication interface 502 transmits a request to resume a TWT service period in response to receiving trigger signal 544 from host 530. Communication interface 502 can transmit a request to resume to the access point (e.g., as a TCP packet). Additionally or alternatively, communication interface 502 can transmit a packet including a bit (e.g., a PM bit) indicating that station 500 has suspended the TWT agreement. Note that in Wi-Fi 3/4/5, the PM bit was used for legacy power save to indicate exiting a power-save mode. However, from Wi-Fi 6 forth, while a negotiated TWT agreement is active, this PM bit serves a different purpose of indicating, to the access point, that the TWT agreement should be suspended. Referring to block 722, communication interface 502 waits to receive feedback from the access point. Referring to block 724, communication interface 502 receives, from the access point, confirmation that the access point will resume TWT service according to the previously negotiated agreement. The access point may send this confirmation in the form of an acknowledgment, and communication interface 502 can forward this confirmation to host 530.

Referring to block 730, host 530 waits for the TWT service period to begin. Host 530 may be configured to determine when a unicast service period will begin based on TWT parameters previously agreed upon between station 500 and the access point. Additionally or alternatively, host 530 may be configured to determine when a broadcast the service period will begin based on a beacon received by station 500.

Referring to block 732, host 530 generates data for transmission to the access point. Host 530 may be configured to begin generating data before the service period begins. For example, host 530 may determine a start time for data generation by determining when station 500 can transmit the data during the service period and subtracting the time that it takes to generate the data. Host 530 may be configured to begin the data generation so that the data will be ready for transmission by the time the service period has begun. Host 530 can send data 540 to communication interface 502 for transmission to the access point. Host 530 can generate the data for transmission by causing a sensor to gather data (e.g., take a measurement or capture an image). Host 530 may receive a signal from the sensor, and host 530 may generate data (e.g., create a TCP packet) based on the received signal.

Referring to block 740, communication interface 502 transmits the generated data to the access point. Communication interface 502 receives data 540 from host 530, and communication interface 502 may be configured to transmit the data across air access 504 to the access point as part of a TCP packet. Referring to block 742, communication interface 502 waits for feedback from the access point. Communication interface 502 may receive an acknowledgment from the access point shortly after transmitting the data. Communication interface 502 may be configured to continue waiting for feedback such as a TCP acknowledgment, which may take longer due to TCP layer end-to-end round trip time to and from another host over the internet through the access point, as compared to sending the L2 transmission acknowledgment.

Referring to block 744, communication interface 502 receives the feedback from the access point. The feedback may be in the form of a TCP packet, such as a TCP acknowledgment, that originates from an external host that is communicatively coupled to the access point via the internet. In response to receiving the feedback from the access point, communication interface 502 may be configured to send feedback 542 to host 530. Communication interface 502 may be configured to also send an acknowledgment of the feedback to the access point.

Referring to block 750, host 530 processes feedback 542 received from communication interface 502. Referring to block 752, host 530 triggers suspension of the TWT service period agreement by sending trigger signal 546 to communication interface 502. Host 530 can send trigger signal 546 in response to determining that feedback 542 indicates that the access point received all of the data sent by station 500.

Referring to block 760, communication interface 502 transmits a request to suspend the TWT service agreement to the access point in response to receiving trigger signal 546 from host 530. Communication interface 502 can transmit a request to suspend to the access point (e.g., as a TCP packet). Additionally or alternatively, communication interface 502 can transmit a packet including a bit (e.g., a PM bit) indicating that station 500 has suspended the TWT service agreement. Communication interface 502 may be configured to transmit an indication of timing for the eventual resumption of TWT service either (1) concurrently with transmitting the request to suspend, or (2) just before or after transmitting the request to suspend. Communication interface 502 can transmit a single packet that includes both the request to suspend and an indication of timing for resumption of TWT service. For example, the single packet may include the timing for resumption as an information frame.

Referring to block 762, communication interface 502 waits to receive feedback from the access point. Referring to block 764, communication interface 502 receives, from the access point, confirmation that the access point will suspend the TWT service agreement. The access point may send this confirmation in the form of an acknowledgment, and communication interface 502 can forward this confirmation to host 530. Referring to block 770, host 530 terminates activity. During the termination of activity, station 500 may be configured to not listen for beacons, trigger frames, or other transmissions from the access point.

Figure 8:
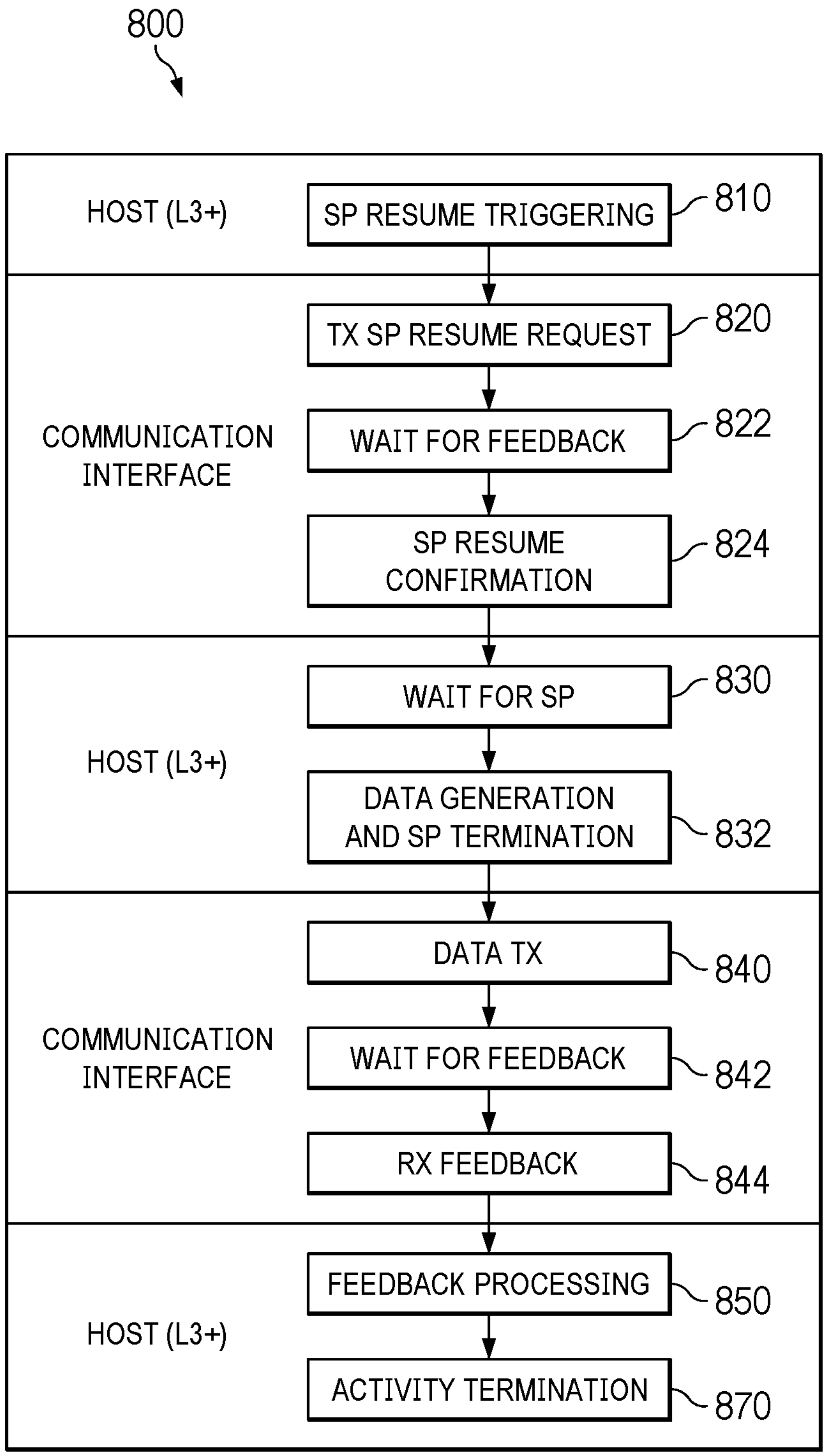

As shown in FIG. 8, method 800 includes some of the steps of method 700, but the data generation and the suspension of the service period agreement have been combined. Thus, after processing feedback from the access point, host 530 can terminate activity because station 500 has already suspended the TWT service agreement.

Referring to block 810, host 530 triggers resumption of a service period agreement by sending trigger signal 544 to communication interface 502. Referring to block 820, communication interface 502 transmits a request to resume the TWT service period agreement in response to receiving trigger signal 544 from host 530. Referring to block 822, communication interface 502 waits to receive feedback from the access point. Referring to block 824, communication interface 502 receives, from the access point, confirmation that the access point will resume TWT service under the agreement.

Referring to block 830, host 530 waits for a TWT service period to begin. Referring to block 832, host 530 generates data for transmission to the access point and triggers suspension of the service period agreement by sending trigger signal 546. Referring to block 840, communication interface 502 transmits the generated data to the access point. Communication interface 502 may transmit the data as a packet that also includes a request to suspend TWT service. Referring to block 842, communication interface 502 waits for feedback from the access point. Referring to block 844, communication interface 502 receives the feedback from the access point. In response to receiving the feedback from the access point, communication interface 502 may be configured to send feedback 542 to host 530.

Referring to block 850, host 530 processes feedback 542 received from communication interface 502. Referring to block 870, host 530 terminates activity. Method 800 includes fewer steps, as compared to method 700, because method 800 combines data generation and suspension of the TWT service agreement. Implementing method 800, host 530 does not have to transmit a request to suspend after processing the feedback from access point in block 850.

Figure 9:
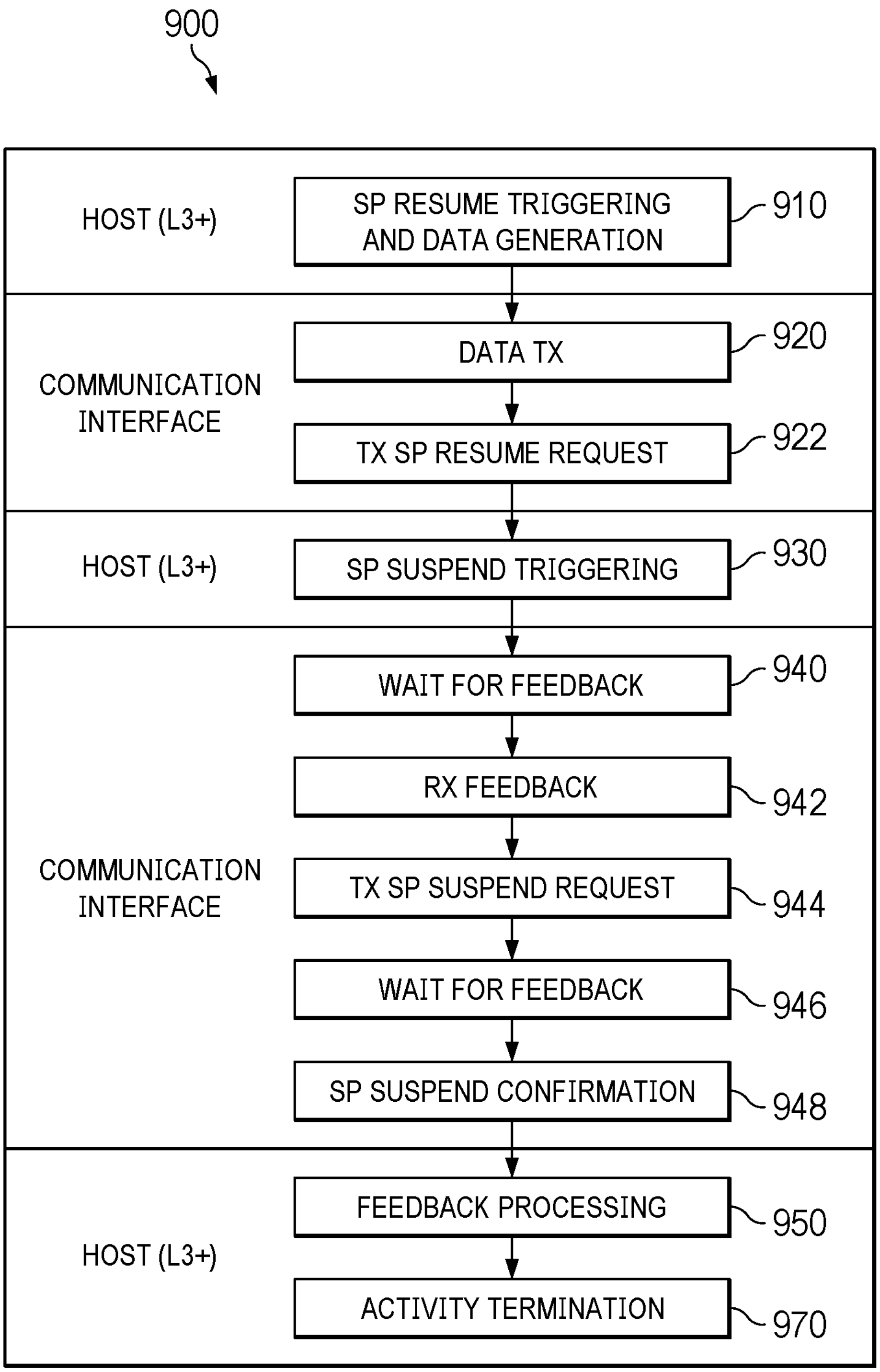

As shown in FIG. 9, method 900 includes some of the steps of methods 700 and 800, but station 500 transmits data as well as a request to resume TWT service. In method 900, host 530 triggers suspension of TWT service before receiving feedback from the access point. Thus, station 500 can trigger suspension after transmitting data and a request to resume.

Referring to block 910, host 530 triggers resumption of TWT service and generates data 540 for transmission. Host 530 can trigger resumption by sending trigger signal 544 to communication interface 502. Alternatively, host 530 may send only data 540 because communication interface 502 may be configured to treat data 540 as an implicit resume trigger when TWT service is currently suspended. Referring to block 920, communication interface 502 transmits the generated data to the access point. Referring to block 922, communication interface 502 transmits the request to resume to the access point. In some examples, the order of blocks 920 and 922 may be swapped so that communication interface 502 transmits the request to resume before transmitting the generated data.

Referring to block 930, host 530 triggers suspension of TWT service by sending trigger signal 546 to communication interface 502. Referring to block 940, communication interface 502 waits to receive feedback from the access point. Referring to block 942, communication interface 502 receives, from the access point, feedback on the data sent by station 500. Referring to block 944, communication interface 502 transmits a request to suspend to the access point. Referring to block 946, communication interface 502 waits to receive feedback from the access point. Referring to block 948, communication interface 502 receives, from the access point, confirmation that the access point will suspend TWT service. Referring to block 950, host 530 processes feedback 542 received from communication interface 502. Referring to block 970, host 530 terminates activity.

Figure 10:
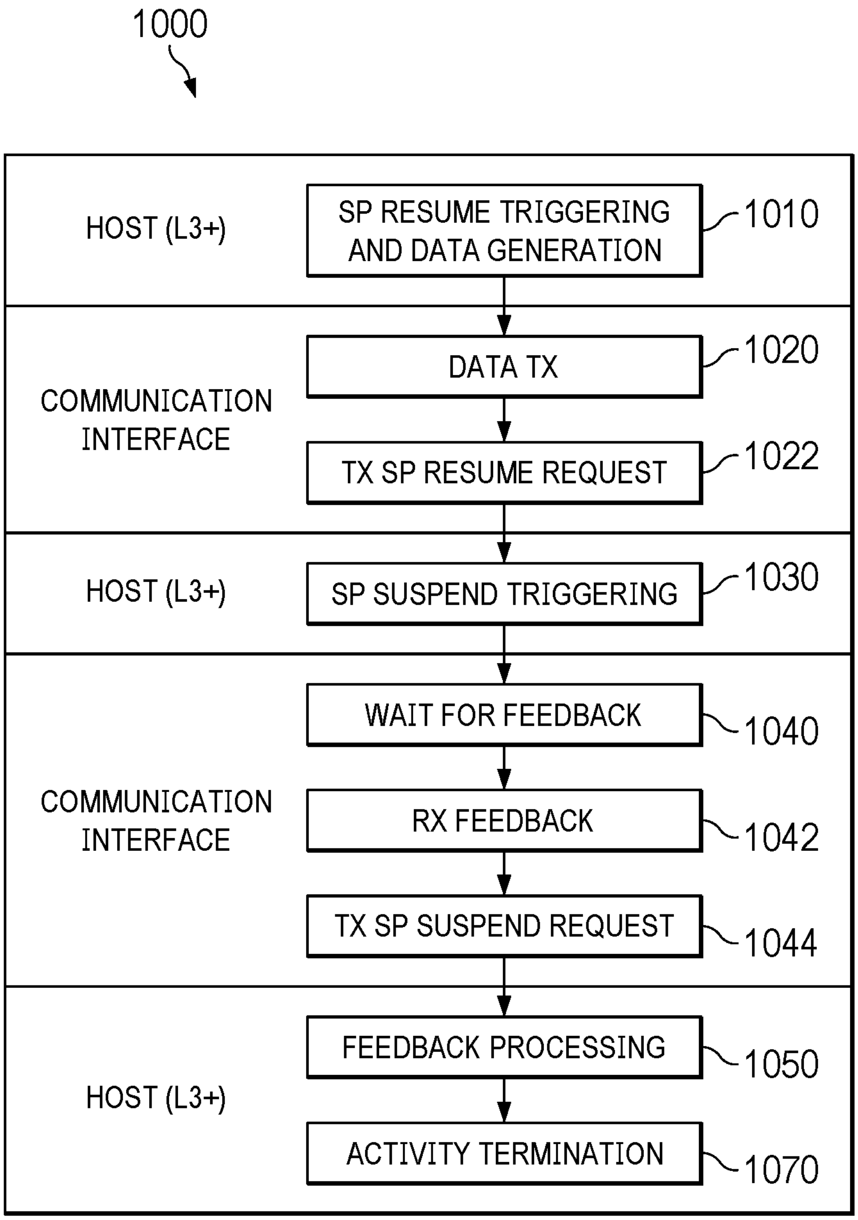

As shown in FIG. 10, method 1000 includes some of the steps of method 900 except for waiting to receive confirmation that the access point has suspended the TWT service agreement. Referring to block 1010, host 530 triggers resumption of TWT service and generates data 540 for transmission. Host 530 may send data 540 along with trigger signal 544, or host 530 may send only data 540. Communication interface 502 may be configured to treat data 540 as an implicit resume trigger when TWT service is currently suspended. Referring to block 1020, communication interface 502 transmits the generated data to the access point. Referring to block 1022, communication interface 502 transmits the request to resume to the access point. In some examples, the order of blocks 1020 and 1022 may be swapped so that communication interface 502 transmits the request to resume before transmitting the generated data.

Referring to block 1030, host 530 triggers suspension of TWT service by sending trigger signal 546 to communication interface 502. Referring to block 1040, communication interface 502 waits to receive feedback from the access point. Referring to block 1042, communication interface 502 receives, from the access point, feedback on the data sent by station 500. Referring to block 1044, communication interface 502 transmits a request to suspend to the access point. Referring to block 1050, host 530 processes feedback 542 received from communication interface 502. Referring to block 1070, host 530 terminates activity after transmitting the request to suspend.

Figure 11:
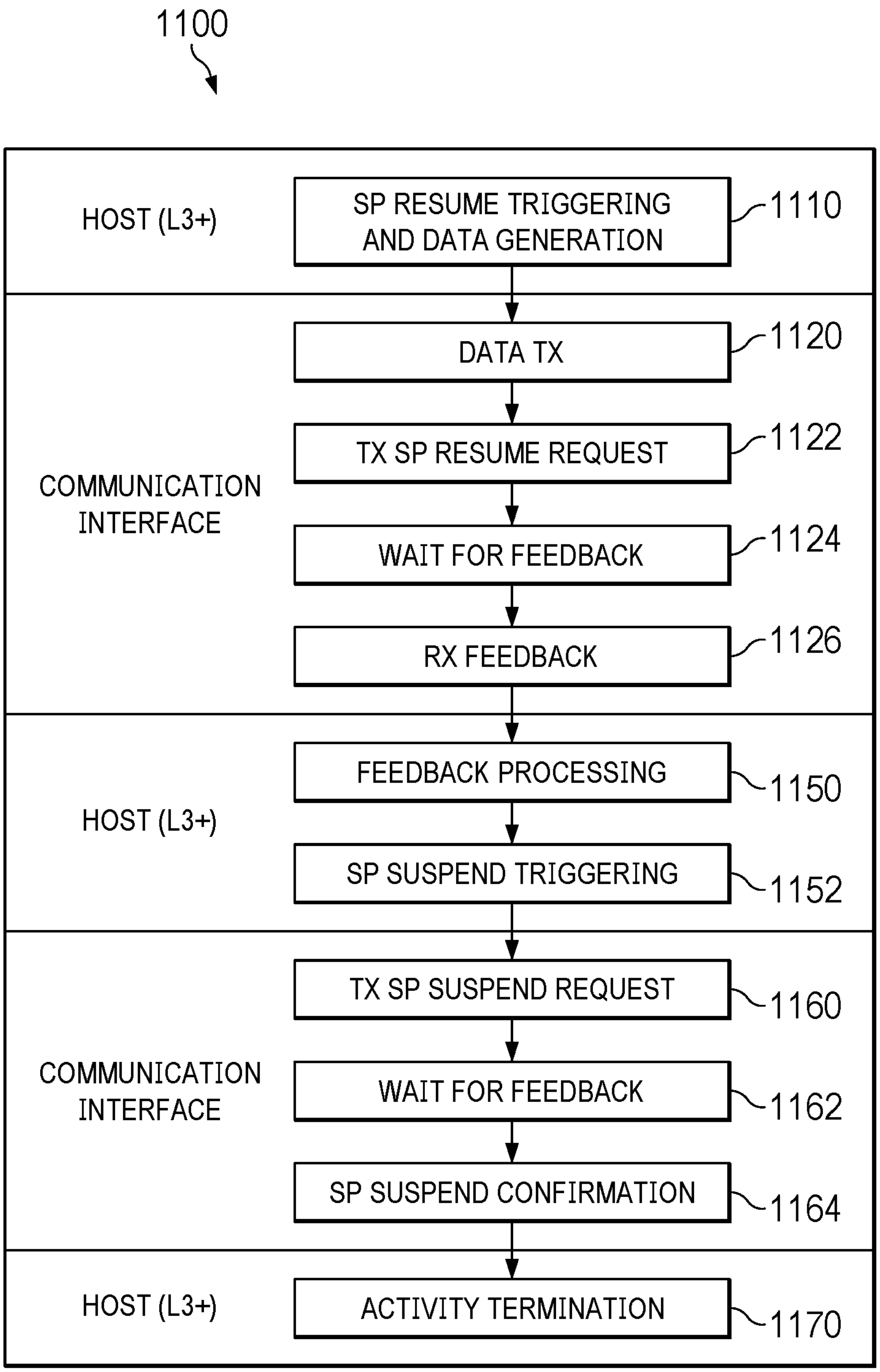

As shown in FIG. 11, method 1100 includes some of the steps of methods 900 and 1000, but host 530 processes feedback from the access point before triggering suspension of TWT service. Referring to block 1110, host 530 triggers resumption of TWT service and generates data 540 for transmission. Host 530 may send data 540 along with trigger signal 544, or host 530 may send only data 540. Communication interface 502 may be configured to treat data 540 as an implicit resume trigger when TWT service is currently suspended. Referring to block 1120, communication interface 502 transmits the generated data to the access point. Referring to block 1122, communication interface 502 transmits the request to resume to the access point. In some examples, the order of blocks 1120 and 1122 may be swapped so that communication interface 502 transmits the request to resume before transmitting the generated data. Referring to block 1124, communication interface 502 waits to receive feedback from the access point. Referring to block 1126, communication interface 502 receives, from the access point, feedback on the data sent by station 500.

Referring to block 1150, host 530 processes feedback 542 received from communication interface 502. Referring to block 1152, host 530 triggers suspension of TWT service by sending trigger signal 546 to communication interface 502. Referring to block 1160, communication interface 502 transmits a request to suspend to the access point. Referring to block 1162, communication interface 502 waits to receive feedback from the access point. Referring to block 1164, communication interface 502 receives, from the access point, confirmation that the access point will suspend the current TWT service agreement. Referring to block 1170, host 530 terminates activity after transmitting the request to suspend.

Figure 12:
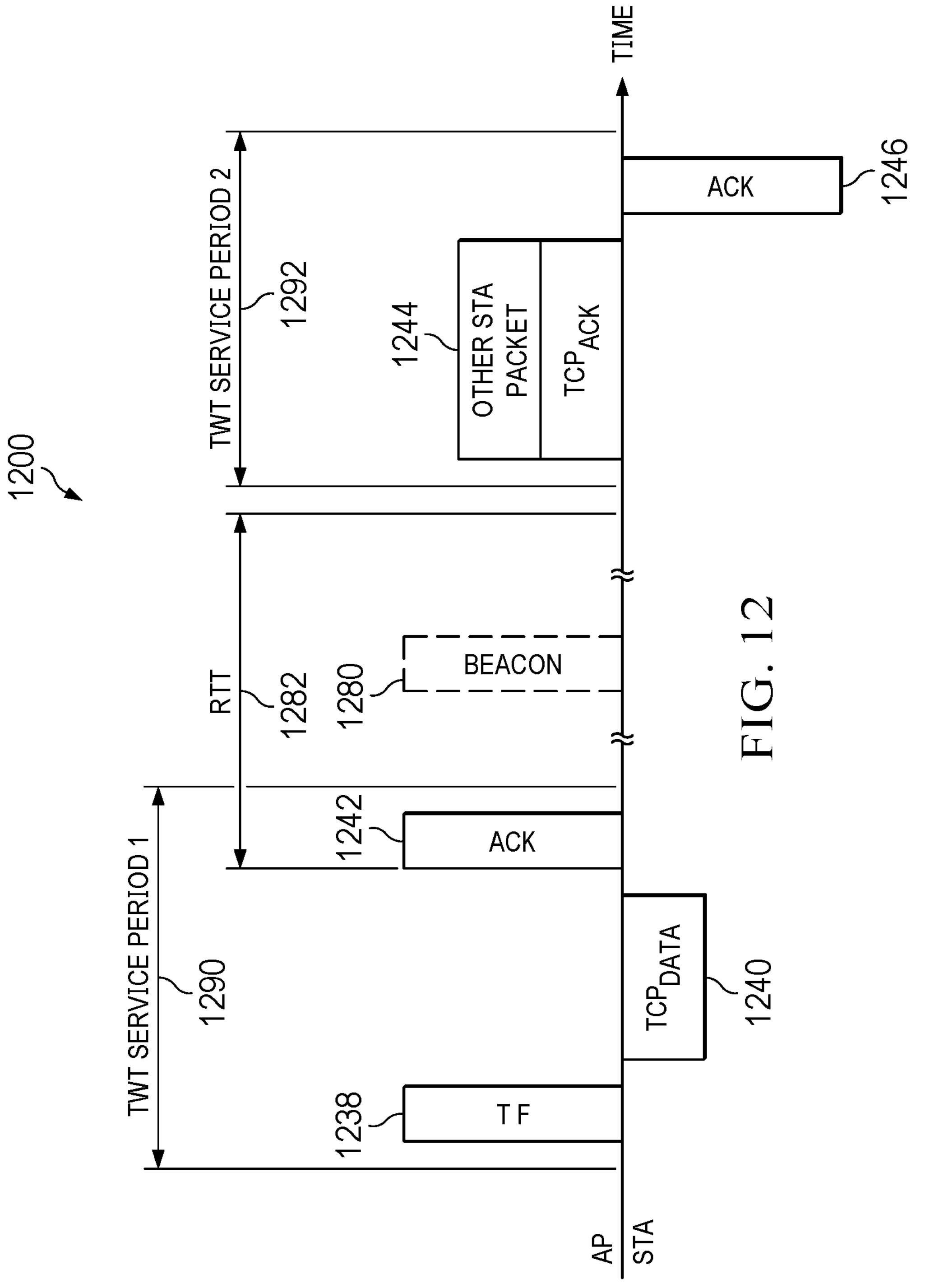
FIGS. 12 and 13 are timing diagrams of the communication of data and the feedback.
Figure 13:
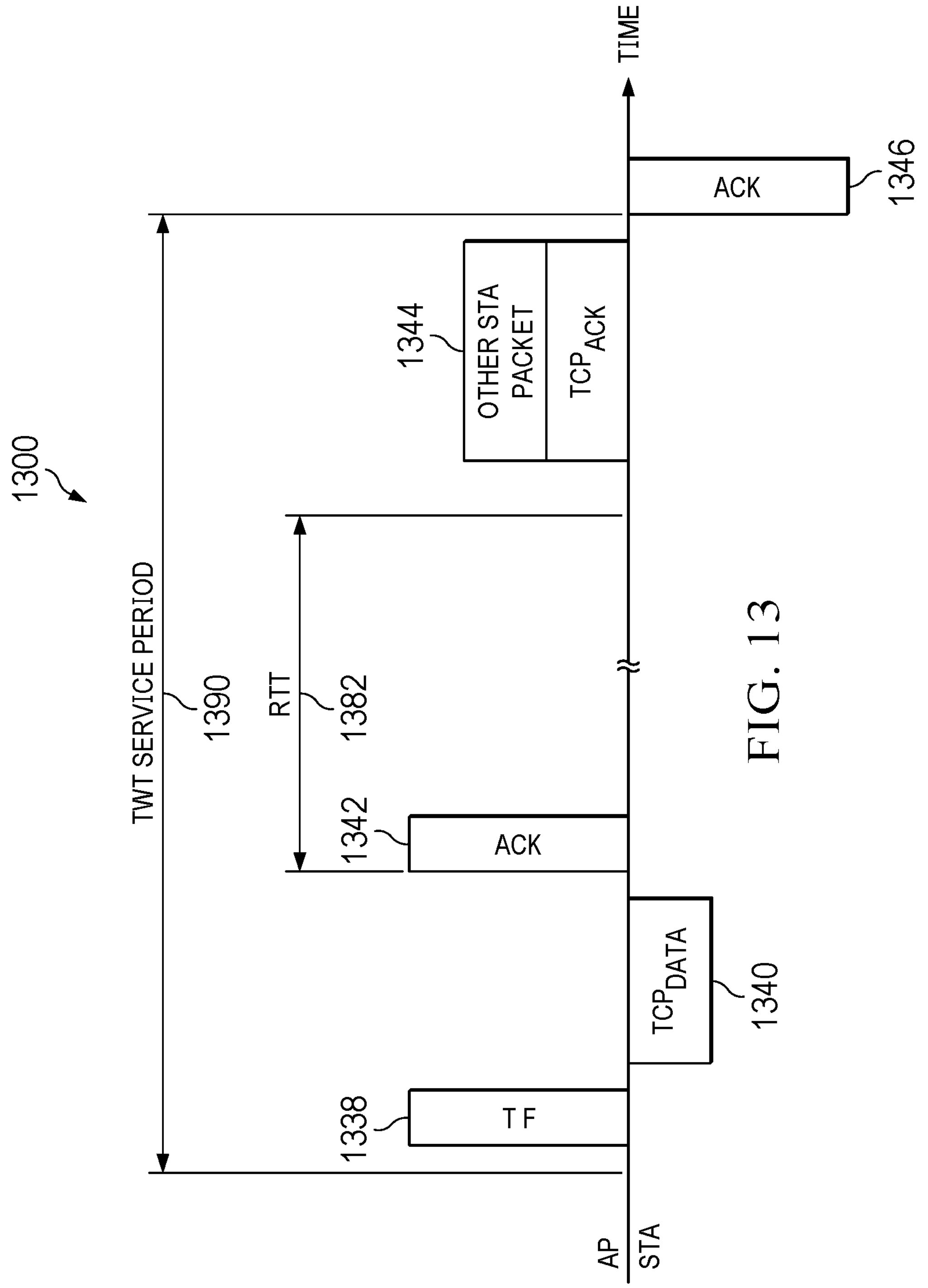

FIGS. 12 and 13 are timing diagrams 1200 and 1300 of the communication of data 1240 and 1340 and the feedback 1244 and 1344. Timing diagrams 1200 and 1300 may correspond to individual unannounced TWT, also referred to as Wi-Fi 6 R1. Timing diagrams 1200 and 1300 depict continuous regular traffic servicing in which a station must be present for every TWT service period with incoming or outgoing traffic. The access point may expel a station from future service periods in response to determining that the station is not present in a service period. Timing diagram 1200 shows the transmission of data 1240 and feedback 1244 during two different service periods: service periods 1290 and 1292. Timing diagram 1300 shows the transmission of data 1340 and feedback 1344 during a single service period: service period 1390. Timing diagrams 1200 and 1300 do not include a request to resume or a request to suspend, unlike the timing diagrams in FIGS. 14-23. Although the methods shown in FIGS. 12-23 are described as distinct processes, station 500 may be configured to perform the methods shown in FIGS. 12-23, or any combination thereof.

During service period 1290, the access point sends trigger frame 1238 to the station to solicit uplink data from the station. The station receives trigger frame 1238 and, responds to the trigger frame 1238 by transmitting data 1240 to the access point. The station may be configured to packetize data obtained by a sensor and transmit data 1240 in the form of a TCP packet. The access point receives data 1240 and responds by transmitting acknowledgment 1242 to the station. Service period 1290 ends when the agreed upon TWT service period duration expires after the access point transmits acknowledgment 1242.

During the interval between service periods 1290 and 1292, the access point transmits beacon 1280 to the station. Beacon 1280 may include information about an upcoming broadcast TWT service period, such as the start time and duration of the broadcast service period. In some examples, the access point transmits beacon 1280 to multiple stations in a network so that any of these stations can participate in the broadcast service period.

The access point receives data 1240 during service period 1290, but the access point must transmit data 1240 to its final destination and wait for feedback 1244 based on data 1240 from the final destination. Round-trip time 1282 is the time that it takes for data 1240 to travel from the station to the final destination via the access point and for feedback 1244 to travel from the final destination back to the station. Round-trip time 1282 is a sufficiently long time duration that feedback 1244 does not reach the station during service period 1290.

During service period 1292, the access point sends feedback 1244 to the station. The access point can send feedback 1244 as a TCP packet along with other information (e.g., multi-user packet to other stations). The station receives feedback 1244 and, responsive to receiving feedback 1244, transmits acknowledgment 1246 to the access point during service period 1292. Service period 1292 ends when the agreed upon TWT SP duration expires after the access point transmits acknowledgment 1246. Although service period 1292 is shown and described as a unicast service period, but the access point may instead transmit feedback 1244 to the station during a broadcast service period. In examples in which the broadcast service period occurs before service period 1292, exchanging feedback 1244 and acknowledgement 1246 during the broadcast service period may allow for the station to enter a low-power mode more quickly than waiting for service period 1292.

As shown in FIG. 13, timing diagram 1300 includes communications that are similar to the communications in timing diagram 1200, except that in timing diagram 1300, all of the communications occur during a single service period: service period 1390. During service period 1390, the access point sends trigger frame 1338 to the station to solicit uplink data from the station. The station receives trigger frame 1338 and, responsive to the trigger frame 1338, transmits data 1340 to the station. The access point receives data 1340 and, responsive to receiving data 1340, transmits acknowledgment 1342 to the station.

The access point forwards data 1340 to its final destination and waits for feedback 1344 based on data 1340. When the access point receives feedback 1344, the access point sends feedback 1344 to the station. The time from transmission of data 1340 to the receipt of feedback 1344 is round-trip time 1382. The access point can send feedback 1344 as a TCP packet along with other information (e.g., multi-user packet to other stations). The station receives feedback 1344 and, responsive to receiving feedback 1344, transmits acknowledgment 1346 to the access point during service period 1390, and service period 1390 ends when TWT SP duration expires (e.g., according to the previously negotiated agreement).

A problem with the conventional Wi-Fi 6 R1 version of individual unannounced TWT is that the station may not have any data to transmit to the access point during a service period (i.e., sparse or no traffic). If the access point does not receive a transmission from the station during the assigned service period, the access point may reject the station for service in subsequent TWT service periods. Thus, the access point may unilaterally terminate of the individual TWT agreement without renewal for significant time periods. For R2, Wi-Fi 6 introduces new Individual TWT extensions that enable the station to request the access point to temporary suspend and resume its TWT service. In Wi-Fi 6 R2 certification, the station can use new TWT information frames to request resumption or suspension of TWT service without renegotiation.

FIGS. 14-17 are timing diagrams 1400, 1500, 1600, and 1700 in which a station transmits requests 1420, 1460, 1520, 1560, 1620, 1660, 1720, and 1760 to resume and suspend a TWT service agreement according to some aspects of the present disclosure. Requests 1420, 1460, 1520, 1560, 1620, 1660, 1720, and 1760 are sent by the station as packets, rather than as a single bit within a packet. Timing diagram 1400 includes request 1420 to resume TWT service sent by the station before the beginning of service period 1490. By transmitting request 1420 to resume before service period 1490, the station may give the access point sufficient time to receive round-trip (i.e. over the internet) feedback 1444 for transmission during service period 1490.

In timing diagrams 1400, 1500, 1600, and 1700 shown in FIGS. 14-17, the station transmits a request to resume TWT service, for example, as a TCP packet separate from other packets. This is just one example of how a station can transmit a request to resume TWT service. In other examples, the station may be configured to generate and transmit, to the access point, a packet including the request to resume along with other information. Additionally or alternatively, the station may be configured to transmit the request to resume as a bit in a packet, as shown in FIGS. 18-23, where a first value of the bit indicates that the station is ready to resume or continue TWT service and a second value of the bit indicates that the station is ready to suspend TWT service. Additionally or alternatively, a station can resume the TWT service by indicating, to the access point, a timestamp of when to resume the next TWT service period on the TWT suspend frame.

Figure 14:
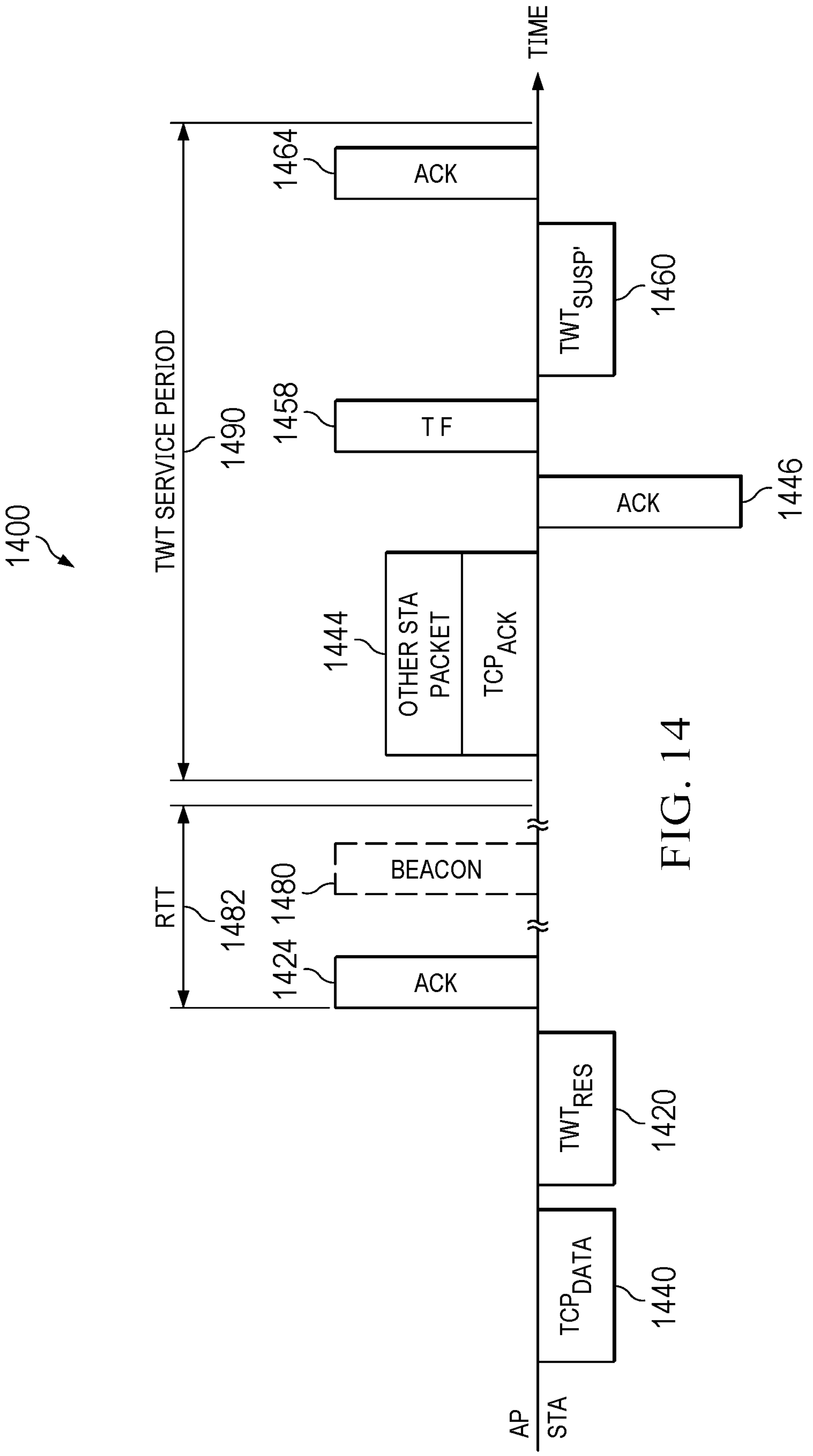
FIGS. 14-17 are timing diagrams in which a station transmits requests to resume and suspend a TWT service agreement according to some aspects of the present disclosure.

The station transmits, to the access point, data 1440 and request 1420 to resume before the beginning of service period 1490. Although FIG. 14 depicts the transmission of data 1440 before the transmission of request 1420 to resume, the station can transmit request 1420 before transmitting data 1440, or the station can transmit a single packet including request 1420 and data 1440. The access point receives request 1420 and data 1440 and, responsive to receiving request 1420 and data 1440, transmits acknowledgment 1424 to the station. The station receives acknowledgment 1424, which may serve as confirmation that the access point will resume TWT service for the station.

In response to receiving request 1420, the access point is configured to resume TWT service for the station. For example, in response to receiving request 1420, the access point may be configured to schedule TWT service (e.g., service period 1490) for the station after the next beacon 1480. In examples in which service period 1490 is a unicast service period, beacon 1480 includes information about a broadcast service period that is not shown in FIG. 14. In this case, the station can save power by ignoring beacon.

However, in examples in which service period 1490 is a broadcast service period, beacon 1480 includes information about service period 1490. If service period 1490 is a broadcast service period that occurs before the next unicast service period, the station can listen to beacon 1480 and participate in service period 1490 to suspend TWT service earlier than the next unicast service period. The station can determine a timing (e.g., start time) of service period 1490 based on information in beacon 1480.

The access point receives data 1440 and forwards data 1440 on to a remote device during round-trip time 1482. During service period 1490, the access point transmits feedback 1444 to the station. The access point can send feedback 1444 as a TCP acknowledgment packet along with other information (e.g., multi-user packet to other stations). The station receives feedback 1444 and, responsive to receiving feedback 1444, transmits acknowledgment 1446 to the access point during service period 1490. As an alternative to exchange shown in FIG. 14, the station can poll the access point for data at the beginning of service period 1490. In response to this poll, the access point sends feedback 1444 to the station.

After receiving acknowledgment 1446, the access point transmits trigger frame 1458 to the station to solicit uplink data from the station. In response to receiving trigger frame 1458, the station transmits request 1460 to suspend TWT service to the access point. In timing diagrams 1400, 1500, 1600, and 1700 shown in FIGS. 14-17, the station transmits a request to suspend TWT service, for example, as a TCP packet separate from other packets. This is just one example of how a station can transmit a request to suspend TWT service. In other examples, the station may be configured to generate and transmit, to the access point, a packet including the request to suspend along with other information. Additionally or alternatively, the station may be configured to transmit the suspend to resume as a bit in a packet, as shown in FIGS. 18-23, where a first value of the bit indicates that the station is ready to resume or continue TWT service and a second value of the bit indicates that the station is ready to suspend TWT service.

The access point receives request 1460 to suspend TWT service and, in response, transmits acknowledgment 1464 to the station before the end of service period 1490. In response to receiving request 1460 to suspend from the station, the access point suspends TWT service for the station by, for example, not expecting that the station will be available in subsequent TWT service periods. Going forward, the access point will not schedule a unicast TWT service period for the station, unless the access point receives a request to resume TWT service from the station. After receiving acknowledgment 1464, the station can enter a low-power state and ignore signals sent by the access point until the station awakens from the low-power state.

Figure 15:
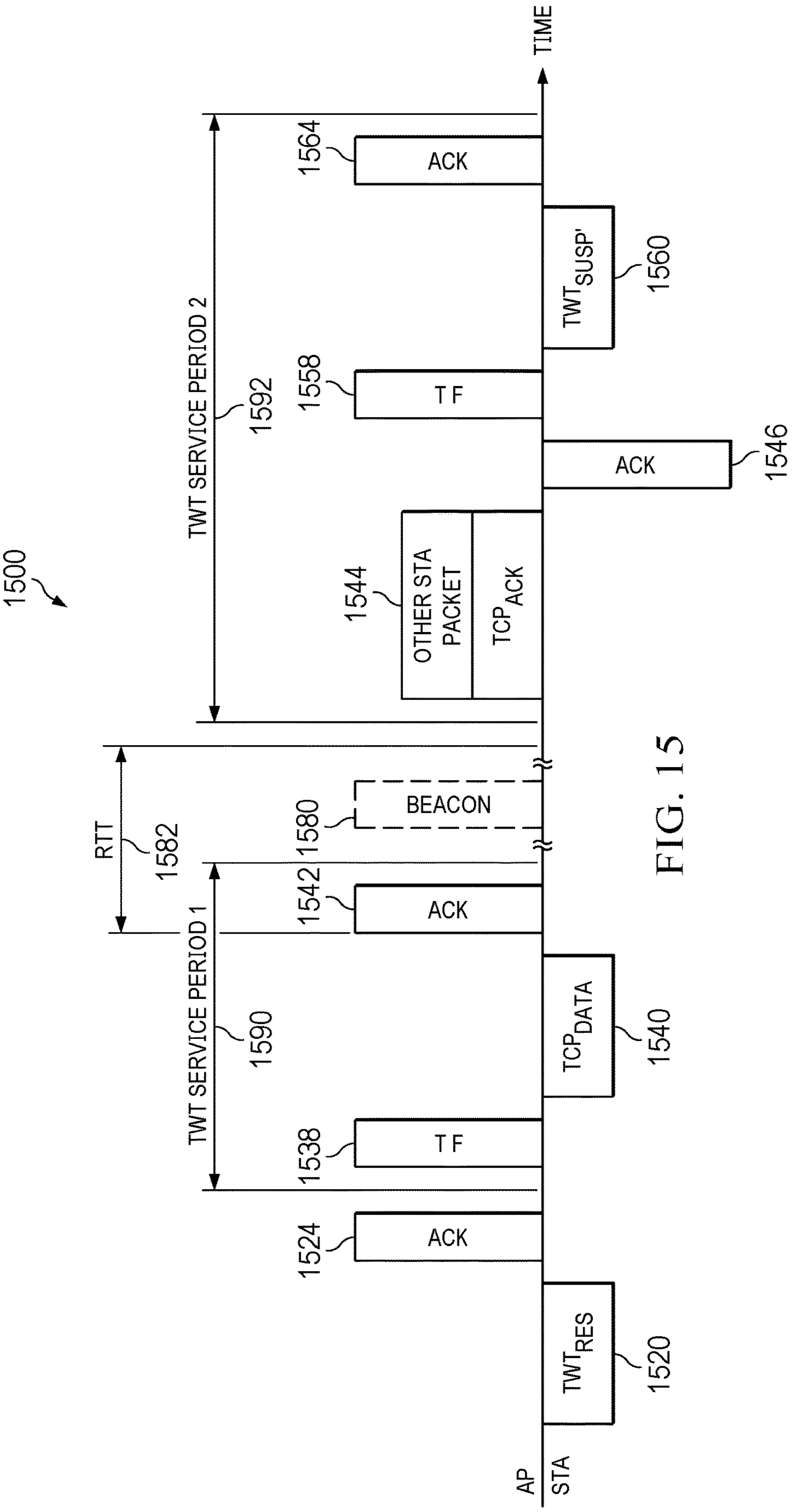

As shown in FIG. 15, timing diagram 1500 includes two service periods 1590 and 1592, and the duration of service period 1590 is shorter than round-trip time 1582. Because of the relatively long round-trip time 1582, feedback 1544 does not reach the station during the same service period 1590 when the station sent data 1540. Instead, the access point sends feedback 1544 to the station during service period 1592.

Timing diagram 1500 includes the station sending request 1520 to resume TWT before the beginning of service period 1590. The access point receives request 1520 and, in response, transmits acknowledgment 1524 to the station. The station receives acknowledgment 1524, which may serve as confirmation that the access point will resume TWT service for the station. After service period 1590 begins, the access point sends trigger frame 1538 to the station to solicit uplink data from the station. In response to receiving trigger frame 1538, the station transmits data 1540 to the access point (e.g., as a TCP packet). The access point receives data 1540 during service period 1590 and, responsive to receiving data 1540, transmits acknowledgment 1542 to the station. Service period 1590 ends when the TWT SP duration expires, in which time the access point transmits acknowledgment 1542 but before the access point receives and forwards feedback 1544 to the station.

The host application can delay the generation of data 1540 until an optimal point to optimize power consumption. In other words, the host application can determine that data generation takes a particular amount of time. The host application may trigger the data generation at least the particular amount of time before the beginning of service period 1590 so that the data is ready when the station receives trigger frame 1538. When the data has been generated, the host application may be configured to send the generated data to the communication interface for transmission to the access point.

During the interval between service periods 1590 and 1592, the access point transmits beacon 1580 to the station. During round-trip time 1582, the access point receives data 1540, forwards data 1540 to the destination host, receives feedback 1544 from the destination host, and transmits feedback 1544 to the station. Round-trip time 1582 is a sufficiently long time duration that the access point does not send feedback 1544 during service period 1590.

During service period 1592, the access point sends feedback 1544 to the station. The station receives feedback 1544 and, responsive to receiving feedback 1544, transmits acknowledgment 1546 to the access point during service period 1592. After receiving acknowledgment 1546, the access point transmits trigger frame 1558 to the station to solicit uplink data from the station. In response to receiving trigger frame 1558, the station transmits request 1560 to suspend TWT service to the access point. The access point receives request 1560 to suspend TWT service and, in response, transmits acknowledgment 1564 to the station, early-suspending service period 1592 (i.e., earlier than the agreed upon TWT SP duration). In response to receiving request 1560 to suspend from the station, the access point suspends TWT service for the station by, for example, not expecting the station to be present for future TWT service periods. Going forward, the access point will not schedule a unicast TWT service period for the station, unless the access point receives a request to resume TWT service from the station.

Figure 16:
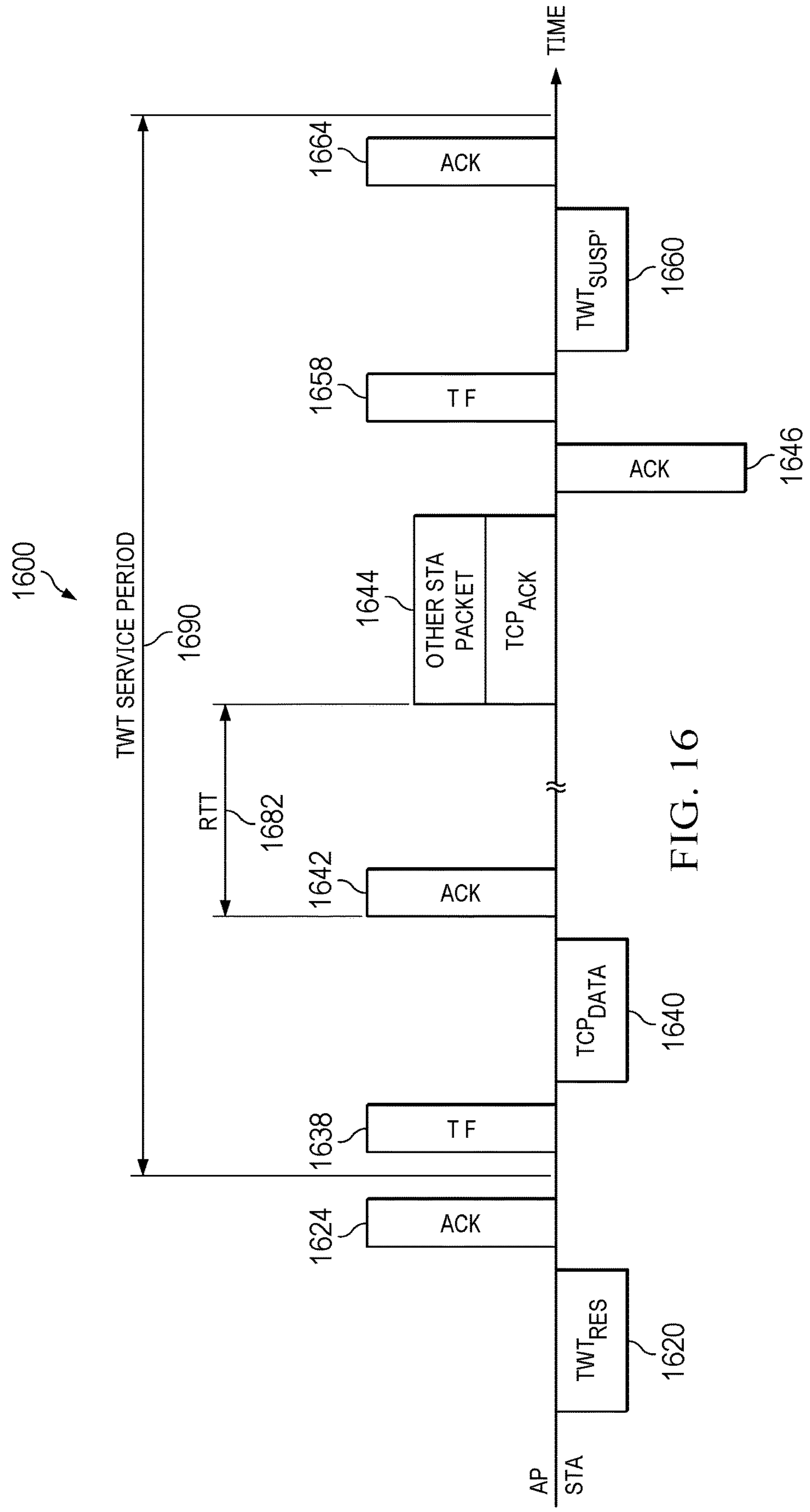

Timing diagram 1600 shown in FIG. 16 includes a round-trip time 1682 shorter compared to the duration of the TWT service period 1690. As a result, the station can transmit data 1640 during service period 1690, and the access point can forward feedback 1644 from destination host during the same service period 1690. The station and access point can conclude their communication within a single service period 1690.

Timing diagram 1600 includes the station sending request 1620 to resume TWT before the beginning of service period 1690. The access point receives request 1620 and, in response, transmits acknowledgment 1624 to the station. After service period 1690 begins, the access point sends trigger frame 1638 to the station to solicit uplink data from the station. In response to receiving trigger frame 1638, the station transmits data 1640 to the access point (e.g., as a TCP packet). The access point receives data 1640 during service period 1690 and, responsive to receiving data 1640, transmits acknowledgment 1642 to the station.

In the example shown in FIG. 16, round-trip time 1682 has a duration that is short enough so that the access point sends feedback 1644 to the station during the same service period 1690. The station receives feedback 1644 during service period 1690 and, responsive to receiving feedback 1644, transmits acknowledgment 1646 to the access point during service period 1690. After receiving acknowledgment 1646, the access point transmits trigger frame 1658 to the station to solicit uplink data from the station. In response to receiving trigger frame 1658, the station transmits request 1660 to suspend TWT service to the access point. The access point receives request 1660 to suspend TWT service and, in response, transmits acknowledgment 1664 to the station before the end of service period 1692. In response to receiving request 1660 to suspend from the station, the access point suspends TWT service for the station.

Figure 17:
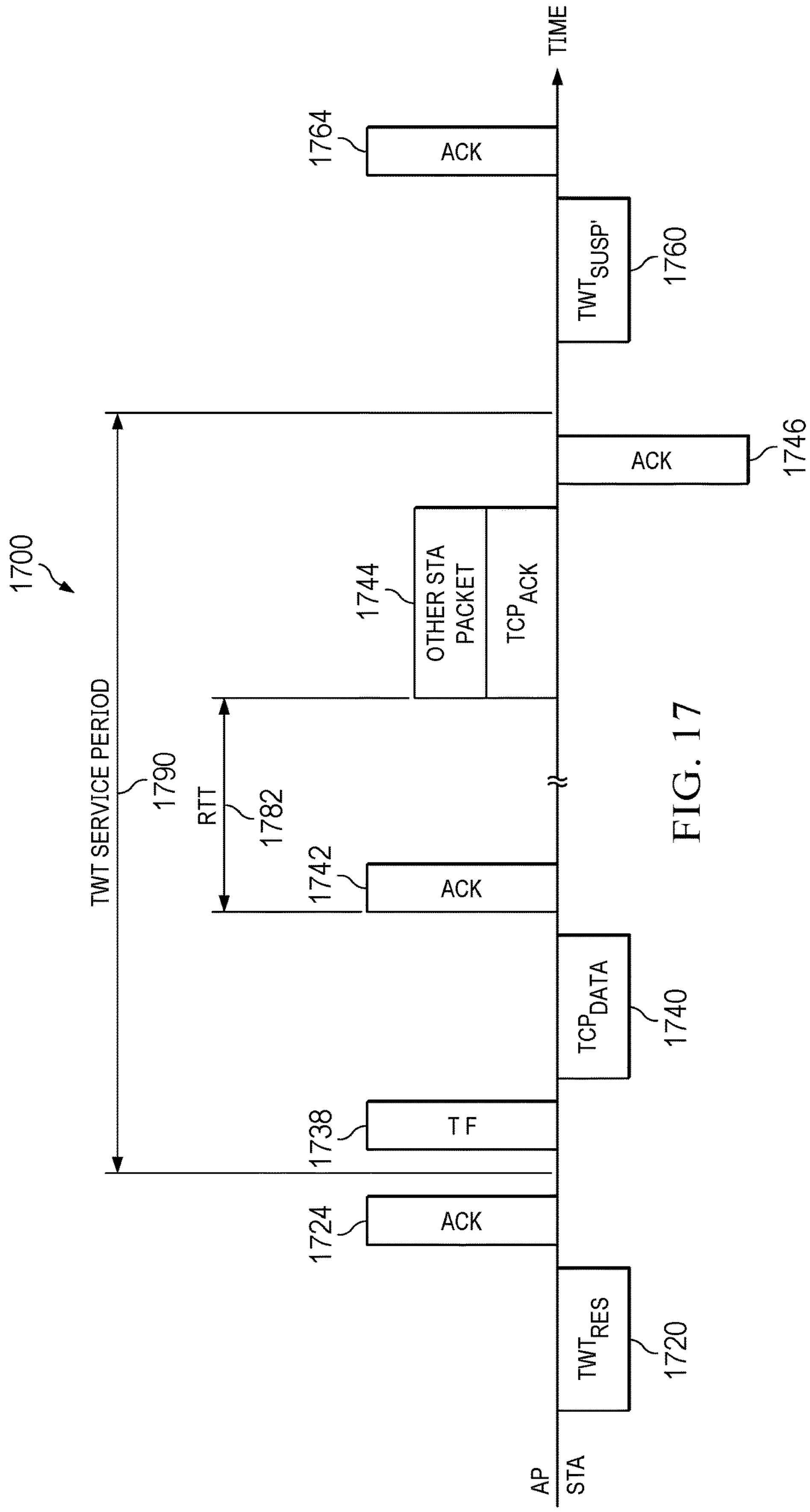

Similar to timing diagram 1600, timing diagram 1700 shown in FIG. 17 includes a relatively short duration for round-trip time 1782, as compared to the duration for service period 1790. As a result, the station can transmit data 1740 during service period 1790, and the access point receives and forwards feedback 1744 to the station during the same service period 1790. However, unlike timing diagram 1600, the station in timing diagram 1700 transmits request 1760 to suspend TWT service after the conclusion of service period 1790. Thus, service period 1790 is not terminated early because the station sends request to suspend 1760 after the ending of service period 1790.

Timing diagram 1700 includes the station sending request 1720 to resume TWT before the beginning of service period 1790. The access point receives request 1720 and, in response, transmits acknowledgment 1724 to the station. After service period 1790 begins, the access point sends trigger frame 1738 to the station to solicit uplink data from the station. In response to receiving trigger frame 1738, the station transmits data 1740 to the access point. The access point receives data 1740 during service period 1790 and, responsive to receiving data 1740, transmits acknowledgment 1742 to the station.

During round-trip time 1782, the access point receives and forwards data 1740 to the destination and receives and forwards feedback 1744 to the station. The station receives feedback 1744 and, responsive to receiving feedback 1744, transmits acknowledgment 1746 to the access point during service period 1790. Service period 1790 ends at a time defined in the TWT service agreement, at some time after the station transmits acknowledgment 1746.

After receiving acknowledgment 1746, and after the ending of service period 1790, the station transmits request 1760 to suspend TWT service to the access point. The access point receives request 1760 to suspend TWT service and, in response, transmits acknowledgment 1764 to the station before the end of service period 1792. In response to receiving request 1760 to suspend from the station, the access point suspends TWT service for the station.

Timing diagram 1700 shows an example in which the station transmits request 1760 to suspend after the end of service period 1790 but before the beginning of the next service period. In some examples, the station is configured to listen for communication between the access point and another station before sending request 1760 to avoid interfering with communication between the access point and the other station.

FIGS. 18-23 are timing diagrams in which a station transmits a request to resume TWT service as a PM bit to an access point according to some aspects of the present disclosure. The timing diagrams in FIGS. 18-23 include the station sending the PM bit either as a stand-alone bit, a bit in a packet, and/or a bit in an acknowledgment. The timing diagrams in FIGS. 18-23 show the request bit as a PM bit, where in case of an active TWT service agreement, a value of zero for the PM bit indicates that the station is ready to resume TWT service under that agreement. In examples in which there is an active TWT service agreement, a value of one for the PM bit indicates that the station is ready to suspend that TWT service agreement. In legacy power save of Wi-Fi 3/4/5 or Wi-Fi 6 when there is no active TWT service agreement between the station and access point, a value of one for the PM bit indicates that the station is active, and a value of zero for the PM bit indicates that the station is in power-save mode.

Although FIGS. 18-23 depict a single bit for requests to resume and suspend, a station may use any number of bits to communicate a request to resume or suspend.

Figure 18:
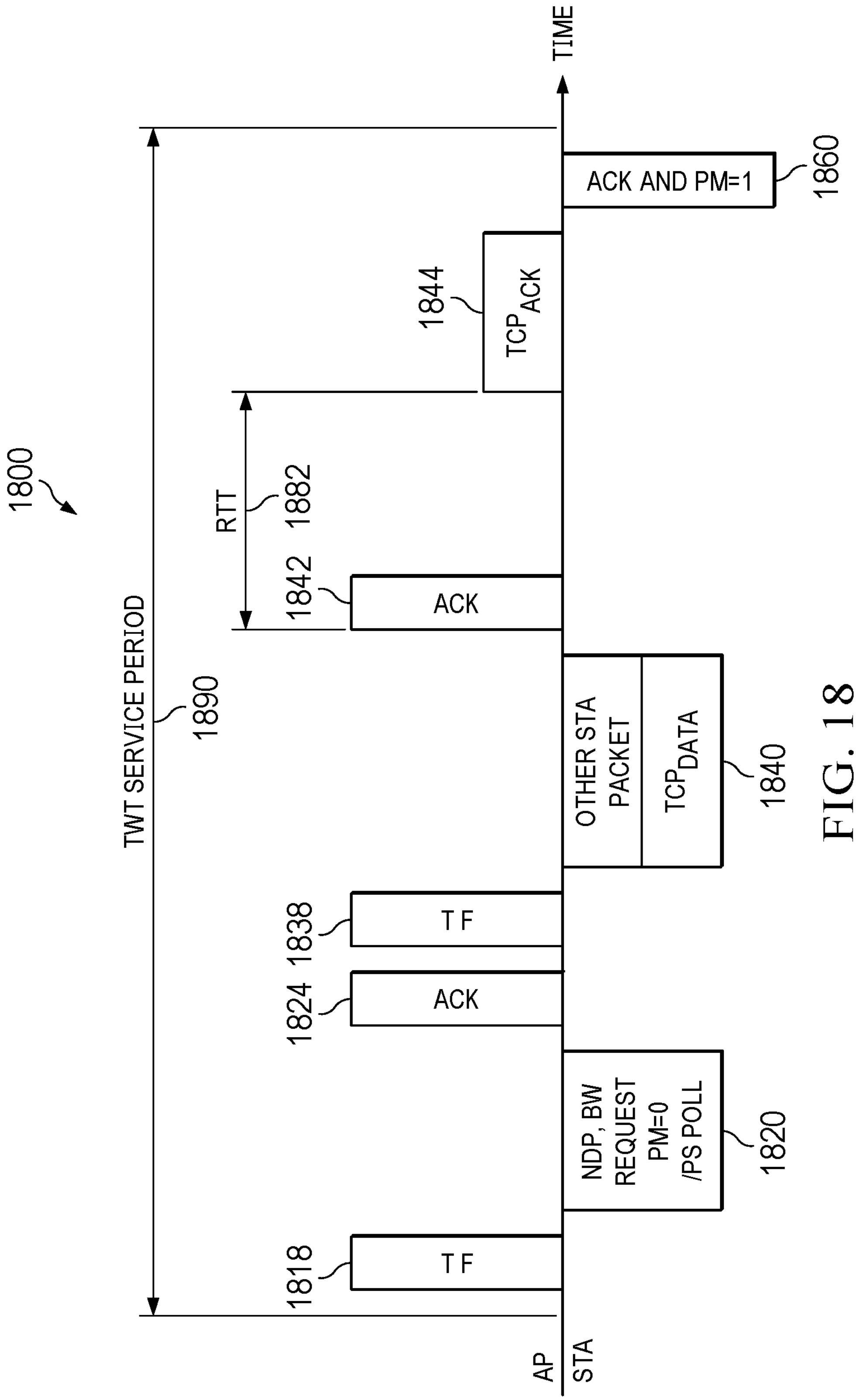
FIGS. 18-23 are timing diagrams in which a station transmits requests to resume and suspend a TWT service agreement as PM bits according to some aspects of the present disclosure.

As shown in FIG. 18, timing diagram 1800 includes short round-trip time 1882 compared to the duration for service period 1890. As a result, the station can transmit data 1840 and receive feedback 1844 during the same service period 1890. The station and access point can conclude their communication within a single service period 1890.

Timing diagram 1800 includes the access point sending trigger frame 1818 to the station early in service period 1890 to solicit status information from the station. Trigger frame 1818 may be a buffer status report poll (BSRP) trigger frame or a normal trigger frame. The station receives trigger frame 1818 and, in response, transmits null data packet 1820, which includes a PM bit set to zero. The value of zero for the PM bit in null data packet 1820 indicates that the station is ready to resume TWT service. The access point receives null data packet 1820 and, in response, transmits acknowledgment 1824 to the station. The station receives acknowledgment 1824, which may serve as confirmation that the access point will resume TWT service for the station.

After sending acknowledgment 1824, the access point transmits trigger frame 1838 to the station to solicit uplink data from the station. In response to receiving trigger frame 1838, the station transmits data 1840 to the access point (e.g., as a TCP packet). The access point receives data 1840 during service period 1890 and, responsive to receiving data 1840, transmits acknowledgment 1842 to the station.

In the example shown in FIG. 18, round-trip time 1882 has a duration that is short enough so that the access point receives and forwards feedback 1844 to the station during the same service period 1890. The station receives feedback 1844 during service period 1890 and, responsive to receiving feedback 1844, transmits acknowledgment 1860 to the access point during service period 1890. The station may be configured to set the PM bit to one in response to receiving feedback 1844.

The station transmits acknowledgment 1860 with a PM bit set to a value of one, which indicates that the station is ready to suspend TWT service. Although FIGS. 18-23 show the station sending, to the access point, a PM bit set to one with an acknowledgment, FIG. 24 shows an alternative implementation. The access point receives acknowledgment 1860 service and, in response, suspends TWT service for the station. Going forward, the access point will not schedule a unicast TWT service period for the station, unless the access point receives a request to resume TWT service from the station.

Figure 19:
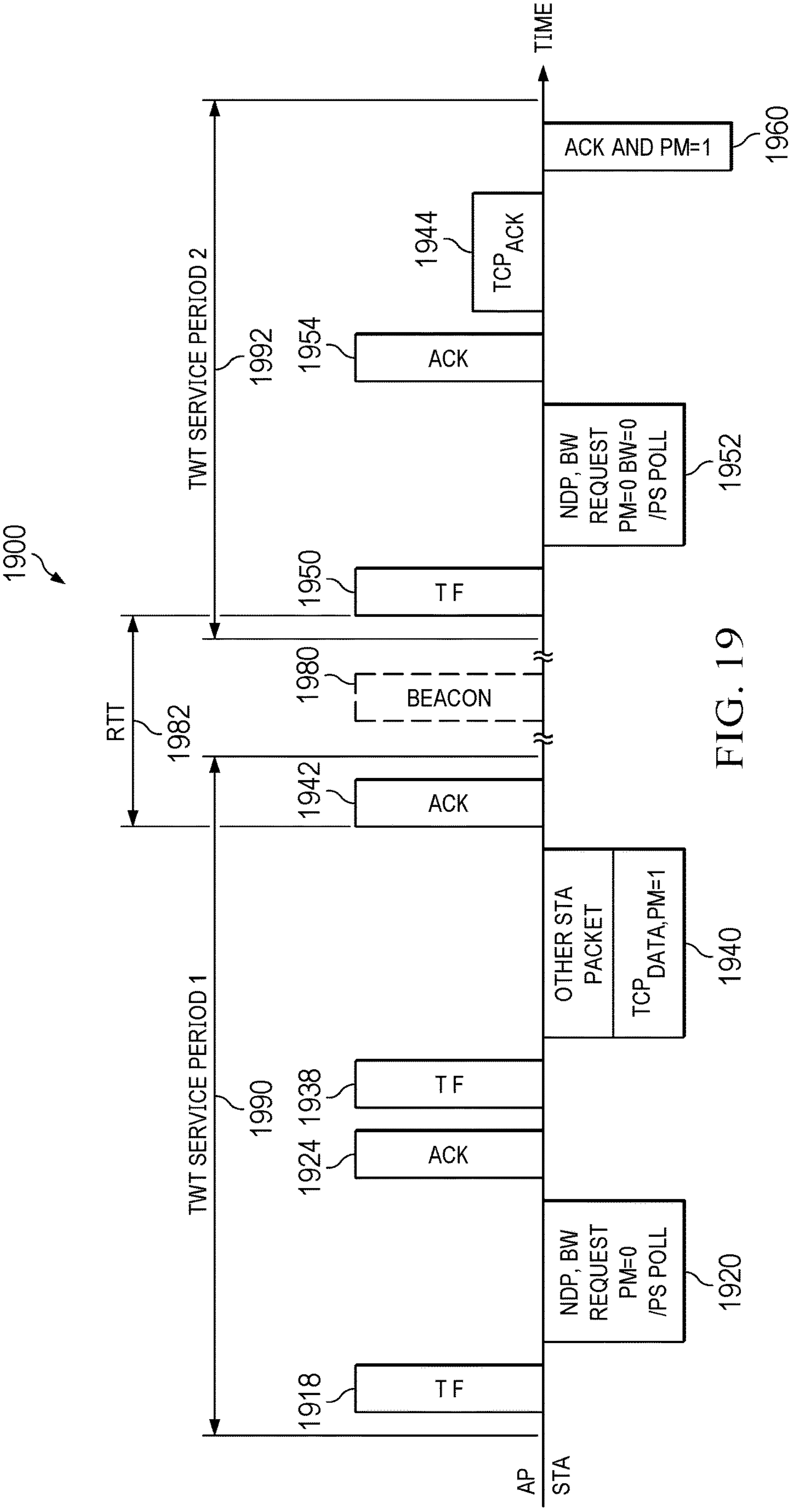

As shown in FIG. 19, timing diagram 1900 includes two service periods 1990 and 1992, and the duration of service period 1990 is shorter than round-trip time 1982. Because of the relatively long round-trip time 1982, the access point cannot send feedback 1944 to the station during the same service period 1990 when the station sent data 1940. Instead, during round-trip time 1982, the access point waits to receive feedback 1944 from the destination host and postpones the forwarding of feedback 1944 until service period 1992.

Timing diagram 1900 includes the access point sending trigger frame 1918 to the station early in service period 1990 to solicit status information from the station. The station receives trigger frame 1918 and, in response, transmits null data packet 1920, which includes a PM bit set to zero. The access point receives null data packet 1920 and, in response, transmits acknowledgment 1924 to the station.

After sending acknowledgment 1924, the access point transmits trigger frame 1938 to the station to solicit uplink data from the station. In response to receiving trigger frame 1938, the station transmits data 1940 to the access point with a PM bit having a value indicating that the station is ready to suspend TWT service. The station is ready to suspend TWT service because the station has already uploaded its data 1940 to the access point. The access point receives data 1940 during service period 1990 and, responsive to receiving data 1940, transmits acknowledgment 1942 to the station. Due to the acknowledgment 1942, the station suspends service period 1990 before the scheduled ending of service period 1990, after the access point transmits acknowledgment 1942. This means that the access point can forward feedback 1944 to the station only when the station requests a resumption of TWT service.

During round-trip time 1982, the access point receives and forwards data 1940 to the destination host and waits to receive feedback from the destination host. Round-trip time 1982 is a sufficiently long time duration that the access point cannot send feedback 1944 during service period 1990.

During service period 1992, the access point transmits trigger frame 1950 to the station early in service period 1992 to solicit status information from the station. Trigger frame 1950 may be a BSRP trigger frame or a normal trigger frame. The station receives trigger frame 1950 and, in response, transmits null data packet 1952, which includes a PM bit set to zero. The access point receives null data packet 1952 and, in response, transmits acknowledgment 1954 to the station. After transmitting acknowledgment 1954, the access point transmits feedback 1944 to the station.

The station receives feedback 1944 and, responsive to receiving feedback 1944, transmits acknowledgment 1960 to the access point during service period 1992. The station transmits acknowledgment 1960 with a PM bit set to a value of one, which indicates that the station is ready to early-suspend the current service period and the TWT service agreement. The access point receives acknowledgment 1960 and, in response, suspends TWT service for the station.

Figure 20:
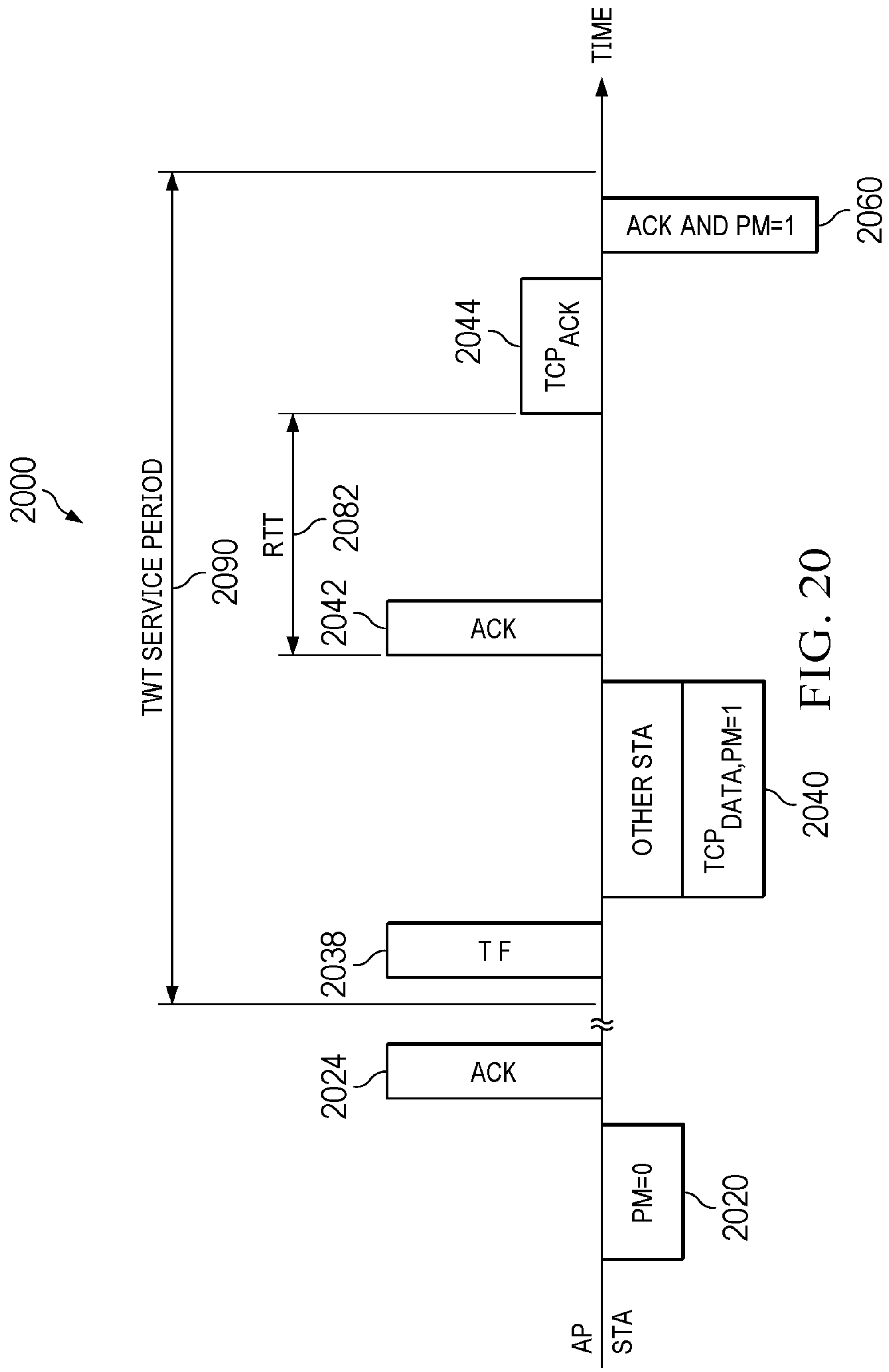
Figure 21:
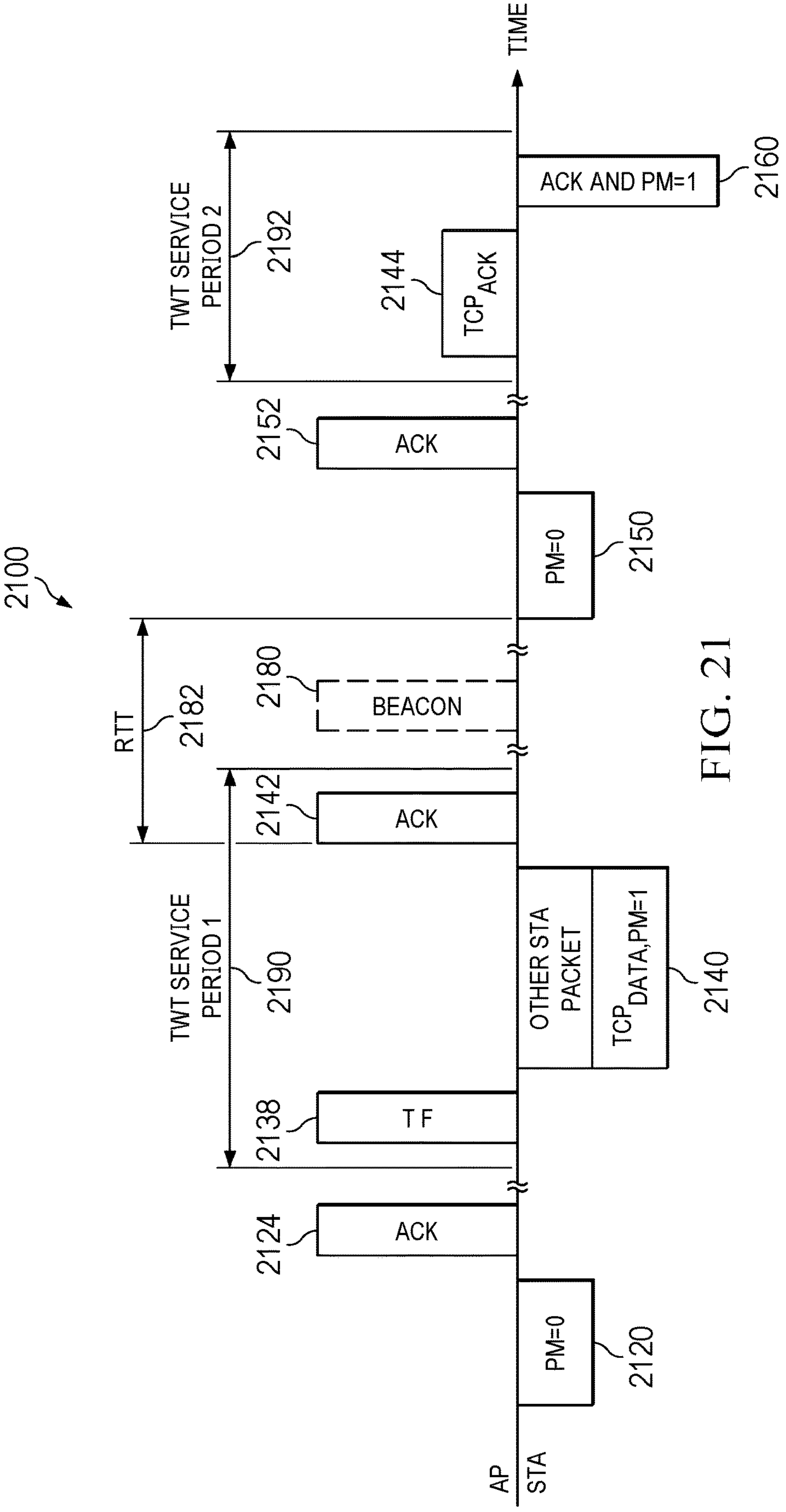
Figure 22:
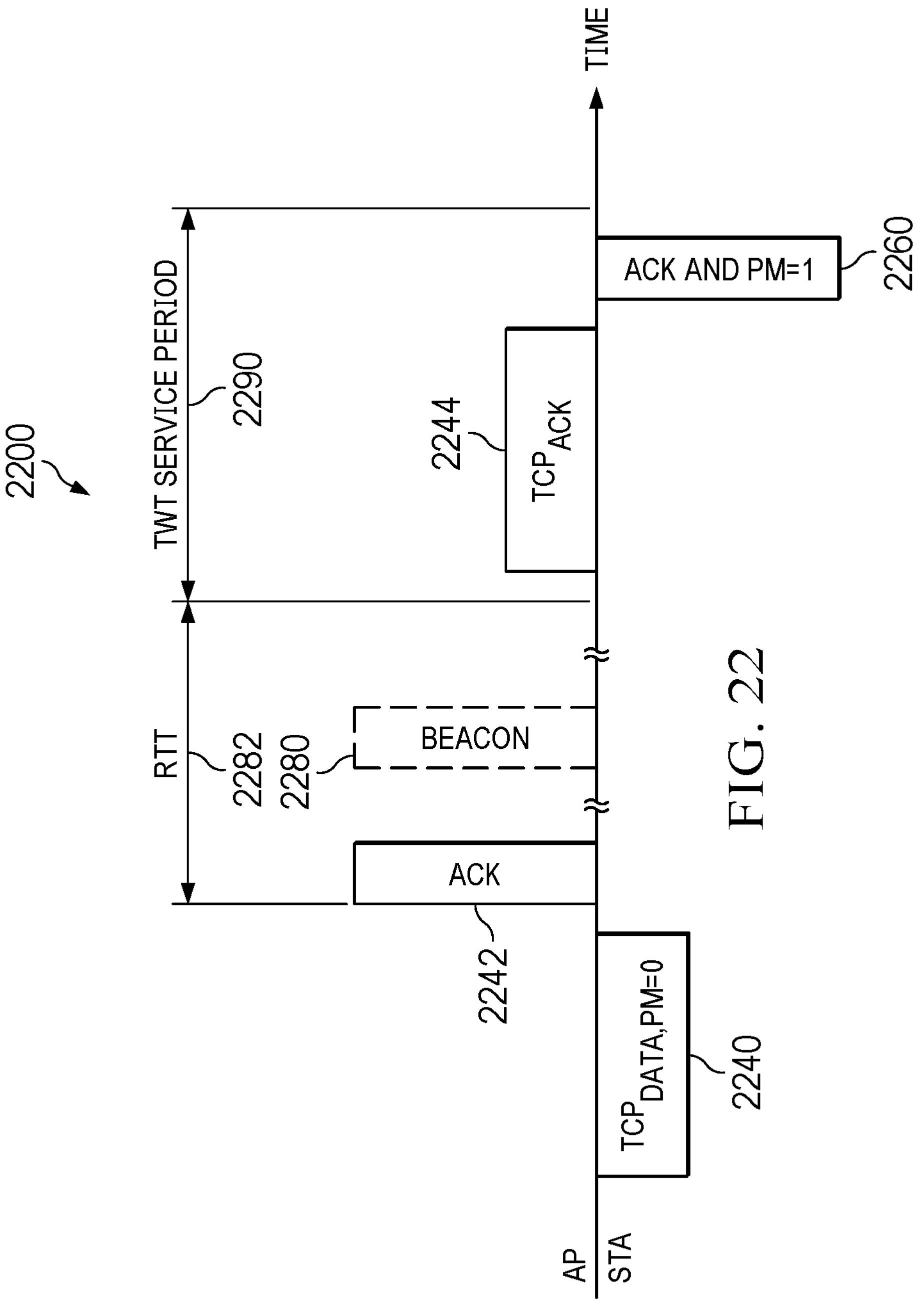

Timing diagram 2000 shown in FIG. 20 includes request 2020 to resume TWT service before the beginning of service period 2090. Similar to timing diagram 1800, round-trip time 2082 is shorter compared to the duration for service period 2090. As a result, the station can transmit data 2040 and receive feedback 2044 during the same service period 2090. The station and access point can conclude their communication within a single service period 2090.

Timing diagram 2000 includes the station transmitting, to the access point, request 2020 to resume TWT service before the beginning of service period 2090. The access point receives request 2020 and, in response, transmits acknowledgment 2024 to the station before the beginning of service period 2090. The station receives acknowledgment 2024, which may serve as confirmation that the access point will resume TWT service for the station. After the beginning of service period 2090, the access point transmits trigger frame 2038 to the station to solicit uplink data from the station. In response to receiving trigger frame 2038, the station transmits data 2040 to the access point (e.g., as a TCP packet) with a PM bit having a value indicating that the station is ready to suspend TWT service. The access point receives data 2040 during service period 2090 and, responsive to receiving data 2040, transmits acknowledgment 2042 to the station.

During round-trip time 2082, the access point receives and forwards data 2040 to the destination host, before receiving feedback 2044 from destination host and forwarding feedback 2044 to the station. In the example shown in FIG. 20, round-trip time 2082 has a duration that is short enough so that the access point can send feedback 2044 during the same service period 2090. The station receives feedback 2044 during service period 2090 and, responsive to receiving feedback 2044, transmits acknowledgment 2060 to the access point during service period 2090. The station transmits acknowledgment 2060 with a PM bit set to a value of one, which indicates that the station is ready to early-suspend current service period and TWT agreement. The access point receives acknowledgment 2060 service and, in response, suspends TWT service for the station.

Timing diagram 2100 is similar to timing diagram 2000, except that the duration of round-trip time 2182 is longer than the duration of service period 2190. Because of the relatively long round-trip time 2182, the access point does not send feedback 2144 to the station during the same service period 2190 when the station sent data 2140. Instead, during round-trip time 2182, the access point receives and holds feedback 2144 from destination host for transmission until service period 2192.

Timing diagram 2100 includes the station transmitting, to the access point, request 2120 to resume TWT service before the beginning of service period 2190. The access point receives request 2120 and, in response, transmits acknowledgment 2124 to the station before the beginning of service period 2190. After the beginning of service period 2190, the access point transmits trigger frame 2138 to the station to solicit uplink data from the station. In response to receiving trigger frame 2138, the station transmits data 2140 to the access point (e.g., as a TCP packet) with a PM bit having a value indicating that the station is ready to suspend TWT service. The station is ready to suspend TWT service because the station has already uploaded its data to the access point. The access point receives data 2140 during service period 2190 and, responsive to receiving data 2140, transmits acknowledgment 2142 to the station.

During the interval between service periods 2190 and 2192, the access point transmits beacon 2180 to the station. Beacon 2180 may include information about an upcoming broadcast service period (not shown in FIG. 21). In examples in which the station will not participate in the broadcast service period, the station can ignore beacon 2180 to conserve power consumption. During round-trip time 2182, the access point receives data 2140, forwards data 2140 to the destination, receives feedback 2144, and forwards feedback 2144 to the station. Round-trip time 2182 is a sufficiently long time duration that the access point does not send feedback 2144 during service period 2190.

During the interval between service periods 2190 and 2192, after receiving beacon 2180, the station transmits request 2150 to resume TWT service to the access point. The access point receives request 2150 and, in response, transmits acknowledgment 2152 to the station before the beginning of service period 2192. After the beginning of service period 2192, the access point transmits feedback 2144 to the station.

The station receives feedback 2144 during service period 2192 and, responsive to receiving feedback 2144, transmits acknowledgment 2160 to the access point during service period 2192. The station transmits acknowledgment 2160 with a PM bit set to a value of one, which indicates that the station is ready to suspend TWT service. The access point receives acknowledgment 2160 service and, in response, suspends TWT service for the station by, for example, not scheduling future TWT service periods for the station. As noted above, FIG. 24 shows an implementation that can be used instead of the station sending acknowledgment 2160 with the PM bit set to one.

Timing diagram 2200 includes the station transmitting data 2240 that includes a request to resume TWT service before service period 2290. Thus, when service period 2290 begins, the access point only needs to send feedback 2244 to the station before TWT service can be suspended. According to timing diagram 2200, the station transmits data 2240 including a PM bit set to a value of zero, indicating that the station is ready to resume TWT service. The station can transmit data 2240 as a TCP packet that includes the PM bit. The access point receives data 2240 before service period 2290 and, responsive to receiving data 2240, transmits acknowledgment 2242 to the station.

Before service period 2290 begins, the access point transmits beacon 2280 to the station. Beacon 2280 may include information about an upcoming broadcast service period. In examples in which the station will not participate in the broadcast service period, the station can ignore beacon 2280 to conserve power consumption.

After the beginning of service period 2290, the access point transmits feedback 2244 to the station. The station receives feedback 2244 during service period 2290 and, responsive to receiving feedback 2244, transmits acknowledgment 2260 to the access point during service period 2290. The station transmits acknowledgment 2260 with a PM bit set to a value of one, which indicates that the station is ready to suspend TWT service. As noted above, FIG. 24 shows an implementation that can be used instead of the station sending acknowledgment 2160 with the PM bit set to one. The access point receives acknowledgment 2260 and, in response, suspends TWT service for the station.

Figure 23:
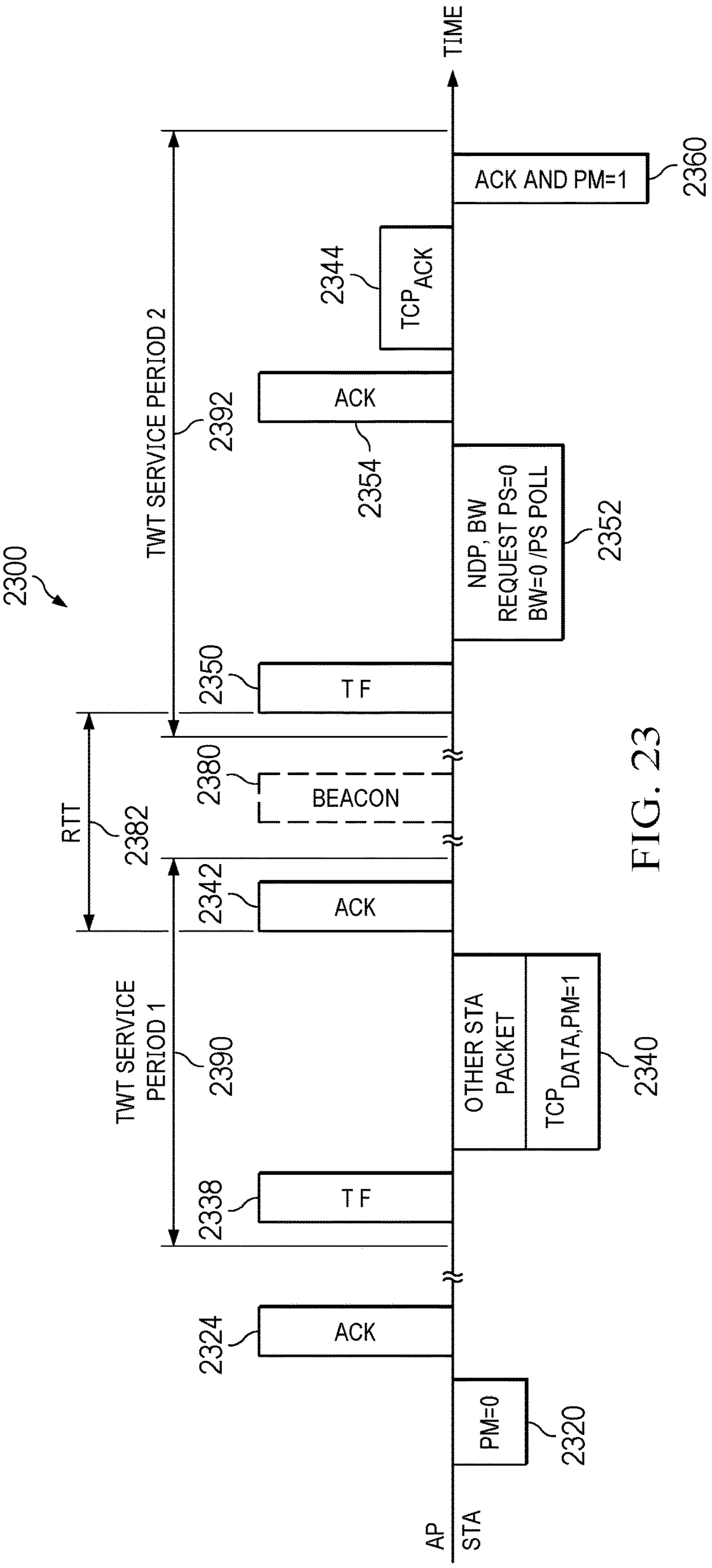
Figure 24:
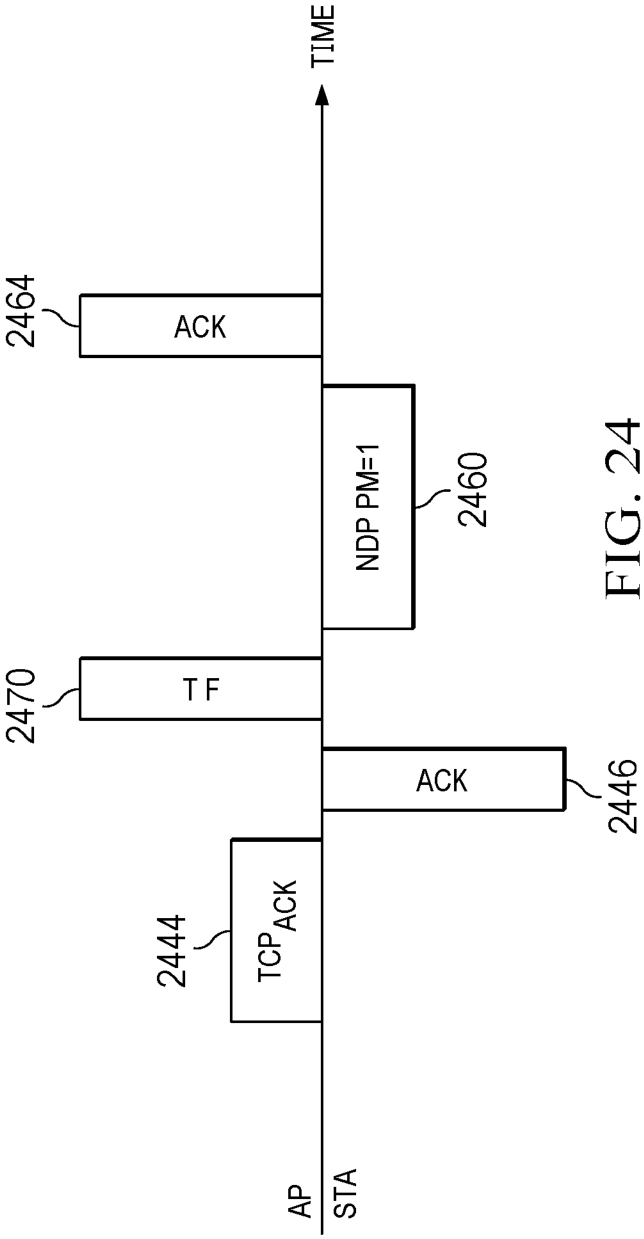
FIG. 24 is a timing diagram in which a station transmits a null data packet including a request to suspend a TWT service agreement according to some aspects of the present disclosure.

As shown in FIG. 23, timing diagram 2300 includes two service periods 2390 and 2392, and the duration of service period 2390 is shorter than round-trip time 2382. Because of the relatively long round-trip time 2382, the access point cannot send feedback 2344 to the station during the same service period 2390 when the station sent data 2340.

Timing diagram 2300 includes the station transmitting, to the access point, request 2320 to resume TWT service before the beginning of service period 2390. The access point receives request 2320 and, in response, transmits acknowledgment 2324 to the station before the beginning of service period 2390. After the beginning of service period 2390, the access point transmits trigger frame 2338 to the station to solicit uplink data from the station. In response to receiving trigger frame 2338, the station transmits data 2340 to the access point (e.g., as a TCP packet) with a PM bit set to a value of one, indicating that the station is ready to suspend TWT service. The station is ready to suspend TWT service because the station has already uploaded its data to the access point. The access point receives data 2340 during service period 2390 and, responsive to receiving data 2340, transmits acknowledgment 2342 to the station.

Figure 25:
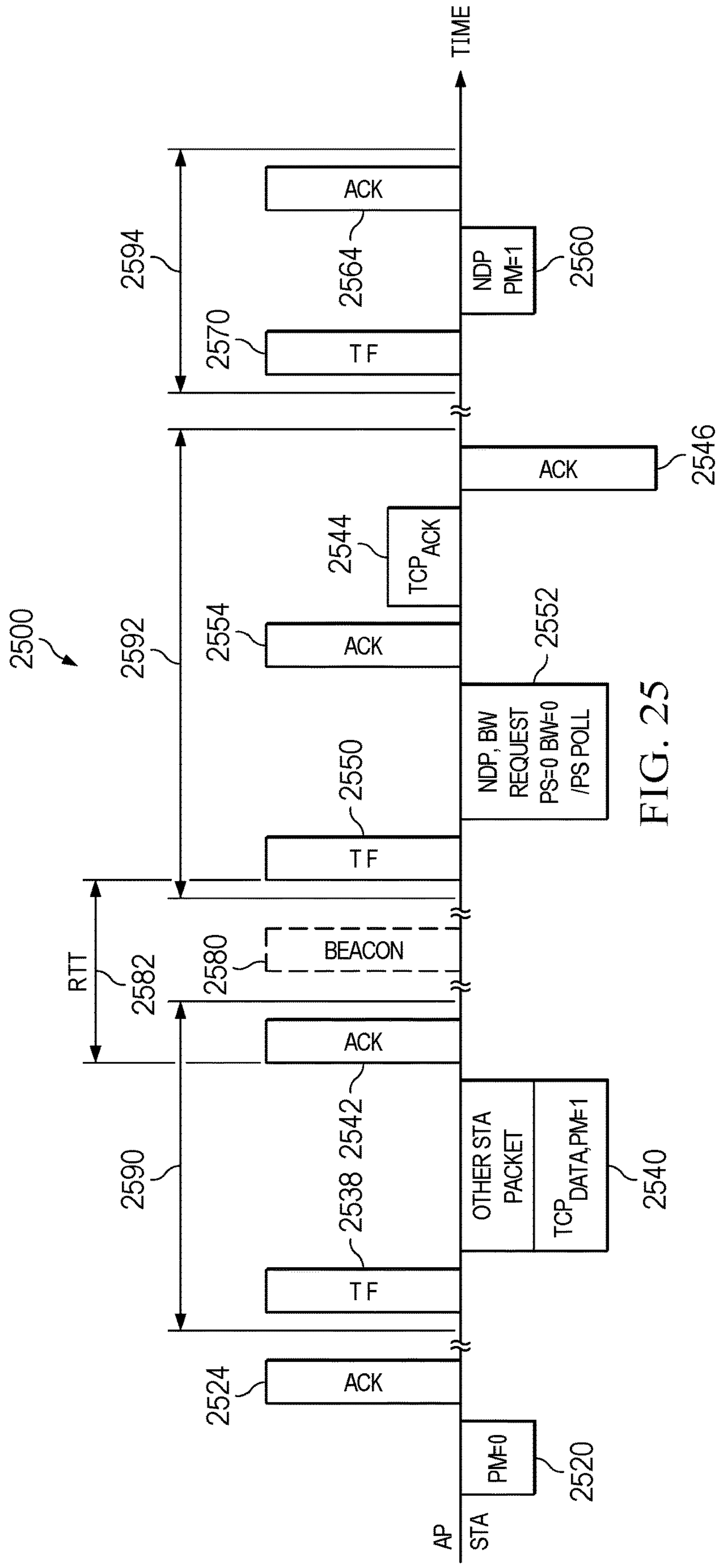
FIGS. 25 and 26 are timing diagrams in which a station and an access point use both unicast and broadcast service periods according to some aspects of the present disclosure.
Figure 26:
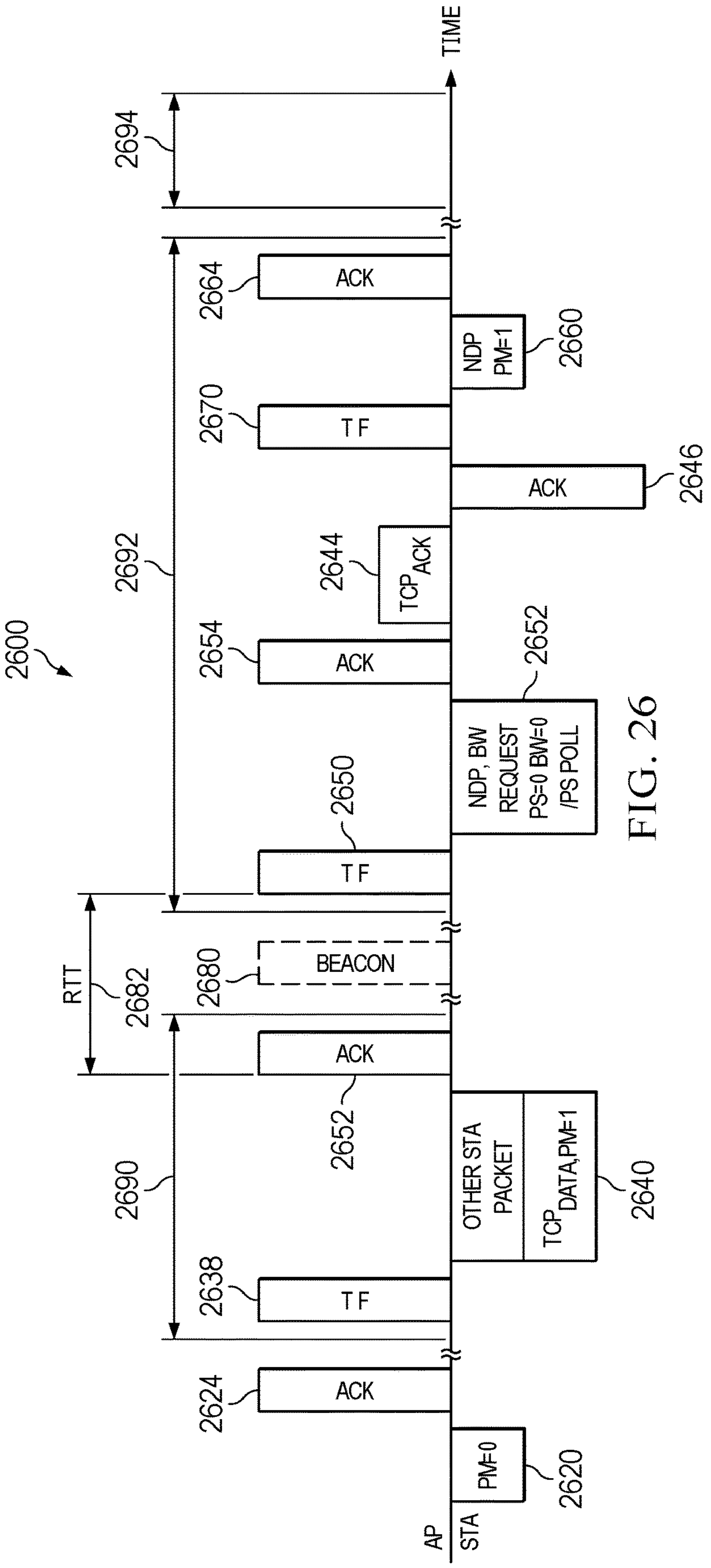

During the interval between service periods 2390 and 2392, the access point transmits beacon 2380 to the station. Beacon 2380 may include information about an upcoming broadcast service period, which is not shown in FIG. 23. As shown in FIGS. 25 and 26, the station can participate in the broadcast service period in order to conclude the communication sooner than waiting for service period 2392. Round-trip time 2382 is a sufficiently long time duration that the access point does not send feedback 2344 during service period 2390.

After the beginning of service period 2392, the access point transmits trigger frame 2350 to the station to solicit status information from the station. The station receives trigger frame 2350 and, in response, transmits null data packet 2352, which includes a PM bit set to zero, indicating that the station is ready to resume or continue TWT service. The access point receives null data packet 2352 and, in response, transmits acknowledgment 2354 to the station.

After transmitting acknowledgment 2354 but before the end of service period 2392, the access point transmits feedback 2344 to the station. The station receives feedback 2344 and, responsive to receiving feedback 2344, transmits acknowledgment 2360 to the access point during service period 2392. The station transmits acknowledgment 2360 with a PM bit set to a value of one, which indicates that the station is ready to suspend TWT service. The access point receives acknowledgment 2360 and, in response, suspends TWT service for the station. Going forward, the access point will not schedule a unicast TWT service period for the station, unless the access point receives a request to resume TWT service from the station.

FIG. 24 is a timing diagram in which a station transmits a null data packet 2460 including a request to suspend a TWT service agreement according to some aspects of the present disclosure. The exchange shown in FIG. 24 can be used instead of transmission of TCP feedback and an acknowledgment, such as transmissions 1844, 1860, 1944, 1960, 2044, 2060, 2144, 2160, 2244, 2260, 2344, and/or 2360.

In the example of FIG. 24, the station sends acknowledgment 2446 in response to receiving feedback 2444 from the access point. After receiving acknowledgment 2446, the access point sends trigger frame 2470 to poll the station for any additional data. As a response to trigger frame 2470, the station sends null data packet 2470 including a PM bit set to a value of one. By setting the PM bit to a value of one, the station is indicating to the access point that the station is ready to suspend the TWT service agreement that is currently in force. When the access point receives null data packet 2470, the access point sends acknowledgment 2464 to the station, indicating that the access point will suspend TWT service for the station. FIG. 24 shows a trigger-based suspend of TWT service, instead of using an acknowledgment with a PM bit to suspend TWT service, as shown in FIGS. 18-23.

FIGS. 25 and 26 are timing diagrams 2500 and 2600 in which a station and an access point use both unicast and broadcast service periods according to some aspects of the present disclosure. In the examples shown in FIGS. 25 and 26, service periods 2590, 2594, 2690, and 2694 are unicast service periods, and service periods 2592 and 2692 are broadcast service periods.

Timing diagram 2500 includes the station transmitting, to the access point, request 2520 to resume TWT service before the beginning of service period 2590. The access point receives request 2520 and, in response, transmits acknowledgment 2524 to the station before the beginning of service period 2590. Service period 2590, like service period 2594, is a unicast service period that is scheduled based on a TWT service agreement. After the beginning of service period 2590, the access point transmits trigger frame 2538 to the station to solicit uplink data from the station. In response to receiving trigger frame 2538, the station transmits data 2540 to the access point (e.g., as a TCP packet) with a PM bit set to a value of one, indicating that the station is ready to suspend TWT service. The access point receives data 2540 during service period 2590 and, responsive to receiving data 2540, transmits acknowledgment 2542 to the station.

After service period 2590, the access point transmits beacon 2580 to the station. Beacon 2580 may include information about upcoming broadcast service period 2592. The station receives beacon 2580 and determines the start time of service period 2592 based on information in the beacon 2580. Round-trip time 2582 is a sufficiently long time duration that the access point does not send feedback 2544 during service period 2590, but feedback 2544 will be ready to send to the station during service period 2592 or 2594.

After the beginning of broadcast service period 2592, the access point transmits trigger frame 2550 to the station to solicit status information from the station. The station receives trigger frame 2550 and, in response, transmits null data packet 2552, which includes a PM bit set to zero, indicating that the station is ready to resume or continue TWT service. With null data packet 2552, the station may also poll the access point for data (e.g., for feedback 2544). The access point receives null data packet 2552 and, in response, transmits acknowledgment 2554 to the station.

After transmitting acknowledgment 2554 but before the end of service period 2592, the access point transmits feedback 2544 to the station. The station receives feedback 2544 and, responsive to receiving feedback 2544, transmits acknowledgment 2546 to the access point during service period 2592. Service period 2592 ends according to the predefined TWT service agreement after acknowledgment 2546. When unicast service period 2594 begins, the access point sends trigger frame 2570 to solicit uplink data from the station. In response to trigger frame 2570, the station sends null data packet 2560 with a PM bit set to a value of one, which indicates that the station is ready to suspend TWT service. The access point receives null data packet 2560 and, in response, sends acknowledgment 2564 and suspends TWT service for the station.

Timing diagram 2600 is similar to timing diagram 2500, except that the station suspends the TWT service during the broadcast service period, rather than waiting for the unicast service period. In the example of FIG. 26, the station sends request to resume 2620 before service period 2690 and then sends data 2640 during service period 2690. After the ending of service period 2690, the access point transmits beacon 2680 to the station. Beacon 2680 may include information about upcoming broadcast service period 2692. The station receives beacon 2680 and determines the start time of service period 2692 based on information in beacon 2680. Round-trip time 2682 is a sufficiently long time duration that the access point does not send feedback 2644 during service period 2690, but feedback 2644 will be ready to send to the station during service period 2692 or 2694.

After the beginning of broadcast service period 2692, the access point transmits trigger frame 2650 to the station to solicit status information from the station. The station receives trigger frame 2650 and, in response, transmits null data packet 2652, which includes a PM bit set to zero, indicating that the station is ready to resume or continue TWT service. The access point receives null data packet 2652 and, in response, transmits acknowledgment 2654 to the station.

After transmitting acknowledgment 2654, the access point transmits feedback 2644 to the station. The station receives feedback 2644 and, responsive to receiving feedback 2644, transmits acknowledgment 2646. After receiving acknowledgment 2646, the access point sends trigger frame 2670 to solicit uplink data from the station. In response to trigger frame 2670, the station sends null data packet 2660 with a PM bit set to a value of one, which indicates that the station is ready to suspend TWT service. The access point receives null data packet 2660 and, in response, sends acknowledgment 2664 and suspends TWT service for the station.

Figure 27:
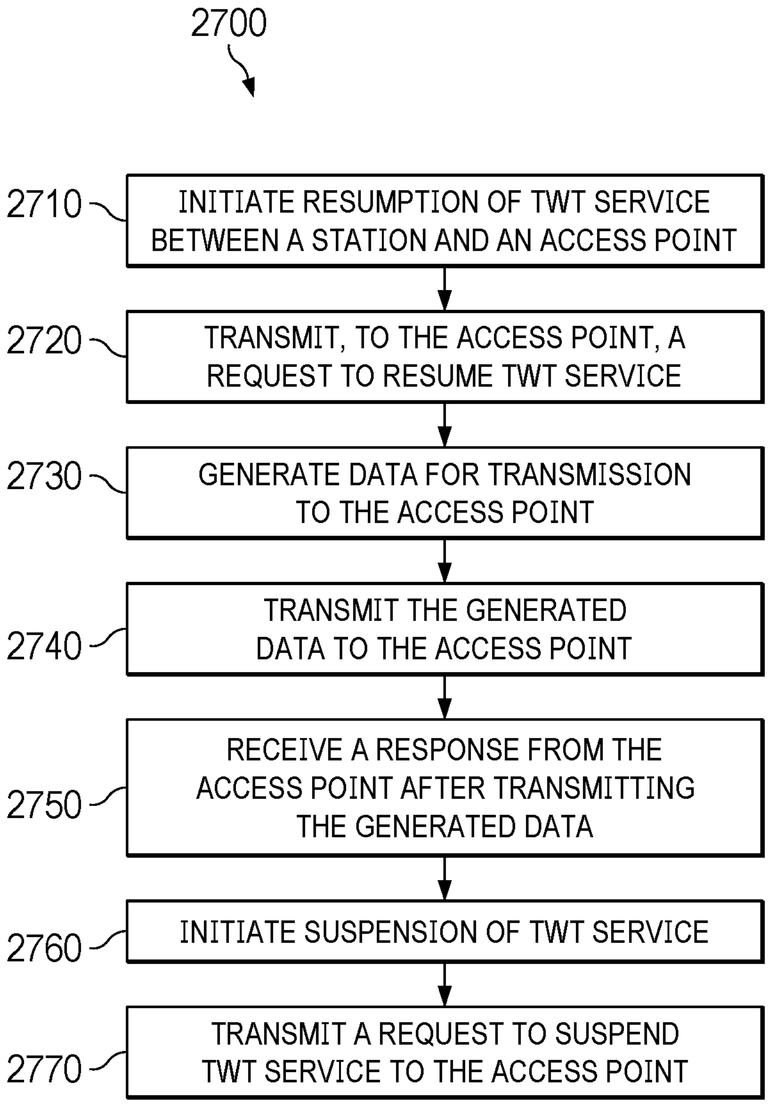
FIG. 27 is a flow diagram of a method for uploading data to an access point according to some aspects of the present disclosure.

FIG. 27 is a flow diagram of a method for uploading data to an access point according to some aspects of the present disclosure. Some processes of the method 2700 may be performed in orders other than described, and many processes may be performed concurrently in parallel. Furthermore, processes of the method 2700 may be omitted or substituted in some examples of the present disclosure. The method 2700 is described with reference to station 500 shown in FIG. 5, although other components such as stations 120, 130, 140, 220, 420, and 430 shown in FIGS. 1, 2, and 4 may exemplify similar techniques.

Referring to block 2710, host 530 initiates resumption of TWT service between station 500 and an access point. Host 530 can initiate resumption of the TWT service, which may mean that a suspended TWT service agreement is resumed. Host 530 may be configured to initiate resumption of service in response to, or as part of, a layer-three event in application 532. Host 530 can initiate resumption of the service period by sending trigger signal 544 to communication interface 502. Alternatively, data 540 may serve as an implicit resume signal, and host 530 may initiate resumption of service by sending data 540 to communication interface 502.

Referring to block 2720, communication interface 502 transmits a request to resume the service period over air access 504 to the access point. Communication interface 502 may be configured to transmit the request to resume as a stand-alone packet. As an alternative, communication interface 502 may be configured to incorporate the request to resume into another packet, such as a TCP data packet, sent by communication interface 502. For example, communication interface 502 may be configured to include a single bit in a TCP data packet or a null data packet, where the value of the single bit indicates that station 500 is ready to resume service.

Referring to block 2730, host 530 generates data for transmission to the access point. Host 530 can generate the data as a TCP packet that includes data obtained by a sensor, such as image data, temperature data, a pressure reading, and/or any other type of data. Host 530 then sends data 540 to communication interface 502. Referring to block 2740, communication interface 502 transmits the generated data to the access point. Referring to block 2750, communication interface 502 receives a response from the access point after transmitting the generated data. The response may be in the form of a TCP packet with a response to the generated data. Communication interface 502 can forward feedback 542 to host 530 for processing.

Referring to block 2760, host 530 initiates suspension of TWT service. Host 530 may be configured to initiate suspension in response to determining that station 500 has transmitted all of its data to the access point. In addition, host 530 may be configured to initiate suspension in response to also determining that station 500 does not need any more data from the access point. Host 530 can initiate suspension by sending trigger signal 546 to communication interface 502.

Referring to block 2770, communication interface 502 transmits a request to suspend the TWT service to the access point. Communication interface 502 may be configured to transmit the request to suspend as a stand-alone packet. As an alternative, communication interface 502 may be configured to incorporate the request to resume into another communication, such as an acknowledgment, sent by communication interface 502. For example, communication interface 502 may be configured to include a single bit in the acknowledgment of the response from the access point, where the value of the single bit indicates that station 500 is ready to suspend service. Upon receiving the request to suspend, the access point may be configured to end the current service period and not expect station 500 to participate in future unicast service periods.

In addition to the steps of method 2700, or as an alternative to any of the steps of method 2700, host 530 and communication interface 502 may be configured to perform the methods shown in FIGS. 7-23, or any combination thereof. The following numbered aspects demonstrate one or more aspects of the disclosure.

FIG. 28 is a diagram of a smart doorbell 2800 that renegotiates for different rates of traffic according to some aspects of the present disclosure. Smart doorbell 2800 may include a wireless station configured to perform the techniques described with respect to the previous figures. For instance, smart doorbell 2800 may be configured to negotiate a TWT service agreement with an access point (not shown in FIG. 28). Smart doorbell 2800 can send, to the access point, data such as notifications, images, video, audio, and the like. Depending on the circumstances, smart doorbell 2800 may have very little data to exchange with the access point (i.e., sparse traffic) or a large amount of data to exchange (i.e., dense traffic). A smart doorbell is just one example of an IoT device that can generate different rates of traffic-any other IoT device or sensor may be configured to perform the techniques described herein.

At time instance 2810, smart doorbell 2800 is generating sparse traffic because there is no person is at the door. In other words, smart doorbell 2800 has not detected any motion or user input. Thus, smart doorbell 2800 may be configured to negotiate a TWT service agreement with the access point for sparse traffic and/or infrequent TWT service periods. Smart doorbell 2800 may be configured to implement an on-demand operating mode, during which smart doorbell 2800 issues a request to resume to communicate with the access point and then issues a request to suspend when that communication has concluded. In some examples, each interval between communication bursts may be much longer than a TWT service period.

For sparse traffic, smart doorbell 2800 may be configured to negotiate for TWT service that spans or totals less than one second every minute, less one hundred milliseconds every minute, or less than ten milliseconds every minute. "Sparse" traffic may mean that the TWT service periods for the respective station account for between a lower bound of 0%, 0.001%, 0.01%, 0.1%, or 1% percent of the total time and an upper bound of 0.1%, 1%, or 5% of the total time. For example, a five-millisecond service period every one minute equates to 0.00833% of the total time.

At time instance 2820, smart doorbell 2800 is generating dense traffic because smart doorbell 2800 has detected motion or user input from delivery driver 2840. In response to detecting this input, smart doorbell 2800 may be configured to renegotiation the TWT service agreement with the access point for increased TWT service. The increased TWT service may be useful for uploading images, video, and/or audio to the internet via the access point. Smart doorbell 2800 may be configured to implement a continuous operating mode, where smart doorbell 2800 can participate in every TWT service period. The interval between the TWT service periods may be relatively short to allow for a higher rate of communication, even if the duration of each TWT service period is shorter duration continuous mode is shorter than the duration of each TWT service period during the sparser on-demand mode. During continuous operating mode, the access point can serve the station every beacon interval without the station having to issue a request to resume or suspend.

For the higher rate of traffic (e.g., dense traffic) at time instance 2820, smart doorbell 2800 may be configured to negotiate for TWT service that spans or totals more than ten milliseconds every second, more than fifty milliseconds every second, more than one hundred milliseconds every second, or more than two hundred milliseconds every second. "Dense" traffic may mean that the TWT service periods for the respective station account for between a lower bound of two, five, ten, or twenty percent of the total time and an upper bound of thirty or fifty percent of the total time. The increased TWT service may result in increased power consumption and interference with communication by other devices, so smart doorbell 2800 may be configured to renegotiate for sparse traffic as soon as smart doorbell 2800 is no longer receiving input from delivery driver 2840.

At time instance 2830, smart doorbell 2800 is generating sparse traffic because there is no person is at the door. Thus, smart doorbell 2800 may be configured to re-negotiate the TWT service agreement with the access point to return to sparse traffic. By reducing traffic, smart doorbell 2800 can conserve power and/or reduce the possibility of interfering with communication by other stations.

This disclosure has attributed functionality to access points 110, 210, and 410, stations 120, 130, 140, 220, 420, 430, and 500, transceiver circuitry 214 and 224, processing circuitry 216 and 226, communication interface 502, and/or host 530. Access points 110, 210, and 410, stations 120, 130, 140, 220, 420, 430, and 500, transceiver circuitry 214 and 224, processing circuitry 216 and 226, communication interface 502, and/or host 530 may include one or more processors. Access points 110, 210, and 410, stations 120, 130, 140, 220, 420, 430, and 500, transceiver circuitry 214 and 224, processing circuitry 216 and 226, communication interface 502, and/or host 530 may include any combination of integrated circuitry, discrete logic circuitry, analog circuitry, such as one or more microprocessors, microcontrollers, digital signal processors, application specific integrated circuits, central processing units, graphics processing units, field-programmable gate arrays, and/or any other processing resources.

In some examples, access points 110, 210, and 410, stations 120, 130, 140, 220, 420, 430, and 500, transceiver circuitry 214 and 224, processing circuitry 216 and 226, communication interface 502, and/or host 530 may include multiple components, such as any combination of the processing resources listed above, as well as other discrete or integrated logic circuitry, and/or analog circuitry.

The techniques described in this disclosure may also be embodied or encoded in an article of manufacture including a non-transitory computer-readable storage medium. Example non-transitory computer-readable storage media may include random access memory (RAM), read-only memory (ROM), programmable ROM, erasable programmable ROM, electronically erasable programmable ROM, flash memory, a solid-state drive, a hard disk, magnetic media, optical media, or any other computer readable storage devices or tangible computer readable media. The term "non-transitory" may indicate that the storage medium is not embodied in a carrier wave or a propagated signal. In certain examples, a non-transitory storage medium may store data that can, over time, change (e.g., in RAM or cache).

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

It is understood that the present disclosure provides a number of exemplary embodiments and that modifications are possible to these embodiments. Such modifications are expressly within the scope of this disclosure. Furthermore, application of these teachings to other environments, applications, and/or purposes is consistent with and contemplated by the present disclosure.

What is claimed is:

1. A method comprising:

initiating, by a host application, resumption of target wakeup time (TWT) service;

transmitting, by a communication interface, a request to resume the TWT service;

generating, by the host application, data for transmission, transmitting, by the communication interface, the generated data;

receiving, after transmitting the generated data, a response;

initiating, by the host application, suspension of the TWT service;

transmitting, by the communication interface, a request to suspend the TWT service;

determining a timing for resumption of the TWT service, wherein the timing for resumption of the TWT service is after the suspension of the TWT service;

before suspending the TWT service, transmitting a packet including an indication of a timing for resumption; and initiating, by the host application, resumption of the TWT service based on the timing for resumption.

2. The method of claim 1, further comprising:

after transmitting the generated data, receiving a beacon from an access point;

determining a timing of a broadcast TWT service period based on the beacon; and polling the access point during the broadcast TWT service period, wherein receiving the response occurs during the broadcast TWT service period after polling the access point.

3. The method of claim 2, further comprising:

negotiating a TWT agreement with the access point; and determining a timing of a unicast TWT service period based on the TWT agreement; and wherein receiving the response occurs during the unicast TWT service period after polling the access point.

4. The method of claim 1, further comprising:

negotiating a first TWT agreement for communication at a first rate;

after negotiating the first TWT agreement, negotiating a second TWT agreement for communication at a second rate at least ten times greater than the first rate; and after negotiating the second TWT agreement, negotiating a third TWT agreement to return to the communication at the first rate, wherein the request to resume the TWT service comprises a request to resume TWT service under the first TWT agreement, and wherein the request to suspend the TWT service comprises a request to suspend TWT service under the first TWT agreement.

5. The method of claim 1, wherein transmitting the request to resume the TWT service and transmitting the generated data comprise transmitting, outside of an upcoming TWT service period, a single packet comprising both the generated data and the request to resume the TWT service.

6. The method of claim 5, further comprising:

determining, based on a TWT agreement, a first time at which the upcoming TWT service period is scheduled to begin;

determining a second time to transmit the single packet based on the first time; and triggering initiation of the resumption of the TWT service at the second time.

7. The method of claim 1, wherein transmitting the generated data comprises transmitting the generated data during a first TWT service period.

8. The method of claim 7, wherein receiving the response occurs during a second TWT service period after the first TWT service period, and wherein transmitting the request to suspend occurs during the second TWT service period.

9. The method of claim 1, wherein transmitting the request to resume comprises transmitting a first packet including a first value of a single bit, wherein transmitting the request to suspend comprises transmitting an acknowledgment of the response including a second value of the single bit.

10. The method of claim 1, wherein transmitting the request to resume TWT service comprises transmitting a first packet including a first value of a single bit, and wherein transmitting the request to suspend TWT service comprises transmitting a response to a trigger frame.

11. The method of claim 1, further comprising:

receiving a trigger frame, wherein transmitting the generated data occurs in response to receiving the trigger frame; and receiving a trigger frame, wherein transmitting the request to suspend TWT service occurs in response to receiving the trigger frame.

12. A device comprising:

transceiver circuitry; and processing circuitry coupled to the transceiver circuitry, the processing circuitry configured to:

negotiate a first TWT agreement for communication at a first rate;

after negotiating the first TWT agreement, negotiate a second TWT agreement for communication at a second rate greater than the first rate; and after negotiating the second TWT agreement, negotiate a third TWT agreement to return to the communication at the first rate;

initiate resumption of target wakeup time (TWT) service;

cause the transceiver circuitry to transmit, a request to resume TWT service under the first TWT agreement;

generate data for transmission;

cause the transceiver circuitry to transmit the generated data;

receive, via the transceiver circuitry after transmitting the generated data, a response;

initiate suspension of the TWT service; and cause the transceiver circuitry to transmit, a request to suspend the TWT service under the first TWT agreement.

13. The device of claim 12, wherein the processing circuitry is further configured to:

determine a timing of a broadcast TWT service period based on a beacon received by the transceiver circuitry; and cause the transceiver circuitry to poll an access point during the broadcast TWT service period, wherein the transceiver circuitry receives the response during the broadcast TWT service period after polling the access point.

14. The device of claim 13, wherein the processing circuitry is further configured to:

negotiate a fourth TWT agreement with the access point; and determine a timing of a unicast TWT service period based on the TWT agreement; and wherein the transceiver circuitry receives the response during the unicast TWT service period after polling the access point.

15. The device of claim 12, wherein the second rate is at least ten times the first rate.

16. A non-transitory computer-readable medium having executable instructions stored thereon, configured to be executable by processing circuitry for causing the processing circuitry to:

initiate resumption of a first target wakeup time (TWT) service;

cause transceiver circuitry to transmit, a request to resume the first TWT service;

generate data for transmission;

cause the transceiver circuitry to transmit the generated data during a first TWT service period;

receive, after transmitting the generated data, a response during a second TWT service period after the first TWT service period;

initiate suspension of the TWT service; and cause the transceiver circuitry to transmit, a request to suspend the TWT service during the second TWT service period.

17. The non-transitory computer-readable medium of claim 16, wherein the instructions are further configured to cause the processing circuitry to:

determine a timing of a broadcast TWT service period based on a beacon received by the transceiver circuitry; and cause the transceiver circuitry to poll an access point during the broadcast TWT service period, wherein the transceiver circuitry receives the response during the broadcast TWT service period after polling the access point.

18. The non-transitory computer-readable medium of claim 17, wherein the instructions are further configured to cause the processing circuitry to:

negotiate a TWT agreement with the access point; and determine a timing of a unicast TWT service period based on the TWT agreement; and wherein the transceiver circuitry receives the response during the unicast TWT service period after polling the access point.

19. The non-transitory computer-readable medium of claim 16, wherein the instructions are further configured to cause the processing circuitry to:

negotiate a first TWT agreement for communication at a first rate;

after negotiating the first TWT agreement, negotiate a second TWT agreement for communication at a second rate at least ten times greater than the first rate; and after negotiating the second TWT agreement, negotiate a third TWT agreement to return to the communication at the first rate, wherein the request to resume the TWT service comprises a request to resume TWT service under the first TWT agreement, and wherein the request to suspend the TWT service comprises a request to suspend TWT service under the first TWT agreement.

* * * * *